(12) United States Patent
Scalisi

(10) Patent No.: US 9,165,444 B2
(45) Date of Patent: Oct. 20, 2015

(54) LIGHT SOCKET CAMERAS

(71) Applicant: SkyBell Technologies, Inc., Irvine, CA (US)

(72) Inventor: Joseph Frank Scalisi, Yorba Linda, CA (US)

(73) Assignee: SkyBell Technologies, Inc., Irvine, CA (US)

( * ) Notice: Subject to any disclaimer, the term of this patent is extended or adjusted under 35 U.S.C. 154(b) by 0 days.

(21) Appl. No.: 14/534,588

(22) Filed: Nov. 6, 2014

(65) Prior Publication Data

US 2015/0062337 A1 Mar. 5, 2015

Related U.S. Application Data

(63) Continuation-in-part of application No. 14/469,583, filed on Aug. 27, 2014, now Pat. No. 8,947,530, and a continuation-in-part of application No. 14/099,888, filed on Dec. 6, 2013, now Pat. No. 8,823,795, and a (Continued)

(51) Int. Cl.
*H04N 7/18* (2006.01)
*H04N 9/47* (2006.01)
*G08B 13/196* (2006.01)
*H04N 5/232* (2006.01)

(Continued)

(52) U.S. Cl.
CPC ....... *G08B 13/19632* (2013.01); *H04M 1/0291* (2013.01); *H04M 11/00* (2013.01); *H04M 11/025* (2013.01); *H04N 5/23238* (2013.01); *H04N 7/183* (2013.01); *H04N 7/186* (2013.01); *H04N 7/188* (2013.01); *G08B 13/19602* (2013.01); *G08B 13/19684* (2013.01); *H04M 1/7253* (2013.01); *H04M 1/72536* (2013.01)

(58) Field of Classification Search
CPC .... F21V 33/00; H04N 5/2252; H04N 5/2251; H04N 5/2256; G03B 15/03; H04L 12/2838; H04L 12/2803; G08B 15/001; G08B 13/1963; G08B 13/19656; G08B 13/1966
USPC ........... 348/143, 151, 152, 155, 156; 382/118
See application file for complete search history.

(56) References Cited

U.S. PATENT DOCUMENTS 1,994,056 A   3/1935  Trompeter
4,982,092 A * 1/1991  Jehle .............................. 250/332

(Continued)

FOREIGN PATENT DOCUMENTS

CN   1902609 B   5/2010
CN   202872976 U   4/2013

(Continued)

OTHER PUBLICATIONS

August Smart Lock—Part 1—downloaded on Jun. 10, 2014 from www.August.com.

(Continued)

*Primary Examiner* — Andy Rao
*Assistant Examiner* — Jared Walker

(57) ABSTRACT

Security systems can be used to detect a visitor. The security system can include a camera that is configured to take a video of the visitor. As well, the security system can be configured to transmit the video of the visitor to a remote computing device. The video of the visitor can be displayed on the remote computing device. The security system can be attached to a light socket.

20 Claims, 27 Drawing Sheets

Related U.S. Application Data continuation-in-part of application No. 14/142,839, filed on Dec. 28, 2013, now Pat. No. 8,842,180, application No. 14/534,588, which is a continuation-in-part of application No. 14/275,811, filed on May 12, 2014, now Pat. No. 8,872,915, and a continuation-in-part of application No. 14/098,772, filed on Dec. 6, 2013, now Pat. No. 8,780,201, application No. 14/534,588, which is a continuation-in-part of application No. 14/463,548, filed on Aug. 19, 2014, now Pat. No. 8,941,736.

(60) Provisional application No. 61/872,439, filed on Aug. 30, 2013, provisional application No. 61/859,070, filed on Jul. 26, 2013, provisional application No. 62/018,605, filed on Jun. 29, 2014, provisional application No. 62/039,394, filed on Aug. 19, 2014.

(51) Int. Cl.
| | | |
|---|---|---|
| *H04M 1/02* | (2006.01) | |
| *H04M 11/00* | (2006.01) | |
| *H04M 11/02* | (2006.01) | |
| *H04M 1/725* | (2006.01) | |

(56) References Cited

U.S. PATENT DOCUMENTS

| | | | |
|---|---|---|---|
| 5,428,388 A | 6/1995 | von Bauer | |
| 5,493,618 A * | 2/1996 | Stevens et al. | 381/110 |
| 5,784,446 A | 7/1998 | Stuart | |
| 6,073,192 A | 6/2000 | Clapp | |
| 6,094,213 A | 7/2000 | Mun | |
| 6,226,031 B1 | 5/2001 | Barraclough | |
| 6,429,893 B1 | 8/2002 | Xin | |
| 6,528,954 B1 | 3/2003 | Lys | |
| 6,590,604 B1 | 7/2003 | Tucker | |
| 6,661,340 B1 | 12/2003 | Saylor | |
| 6,727,811 B1 | 4/2004 | Fendis | |
| 6,753,899 B2 | 6/2004 | Lapalme | |
| 6,778,084 B2 | 8/2004 | Chang | |
| 7,015,943 B2 | 3/2006 | Chiang | |
| 7,193,644 B2 | 3/2007 | Carter | |
| 7,429,924 B2 | 9/2008 | Langer et al. | |
| 7,477,134 B2 | 1/2009 | Langer et al. | |
| 7,492,303 B1 | 2/2009 | Levitan | |
| 7,583,191 B2 | 9/2009 | Zinser | |
| 7,738,917 B2 | 6/2010 | Ryley | |
| 7,746,223 B2 | 6/2010 | Howarter | |
| 7,752,070 B2 | 7/2010 | Hatcher | |
| 8,016,676 B2 | 9/2011 | Carter | |
| 8,139,098 B2 | 3/2012 | Carter | |
| 8,144,183 B2 | 3/2012 | Carter | |
| 8,144,184 B2 | 3/2012 | Carter | |
| 8,154,581 B2 | 4/2012 | Carter | |
| 8,164,614 B2 | 4/2012 | Carter | |
| 8,193,919 B2 | 6/2012 | Langer | |
| 8,504,103 B2 | 8/2013 | Ficquette | |
| 8,562,158 B2 * | 10/2013 | Chien | 362/3 |
| 8,565,399 B2 | 10/2013 | Siminoff | |
| 8,780,201 B1 | 7/2014 | Scalisi | |
| 8,823,795 B1 | 9/2014 | Scalisi | |
| 8,842,180 B1 | 9/2014 | Scalisi et al. | |
| 2001/0010555 A1 * | 8/2001 | Driscoll, Jr. | 348/335 |
| 2003/0197807 A1 | 10/2003 | Wu | |
| 2004/0085205 A1 | 5/2004 | Yeh | |
| 2004/0086093 A1 | 5/2004 | Schranz | |
| 2004/0229569 A1 | 11/2004 | Franz | |
| 2005/0046584 A1 * | 3/2005 | Breed | 340/825.72 |
| 2005/0097248 A1 | 5/2005 | Kelley | |
| 2005/0237208 A1 * | 10/2005 | Wojcik | 340/573.2 |
| 2005/0285944 A1 | 12/2005 | Watanabe | |
| 2006/0156361 A1 | 7/2006 | Wang | |
| 2006/0271678 A1 | 11/2006 | Jessup | |
| 2007/0126574 A1 | 6/2007 | Langer | |
| 2007/0194945 A1 | 8/2007 | Atkinson | |
| 2008/0036862 A1 | 2/2008 | Lang | |
| 2008/0297339 A1 | 12/2008 | Mathews | |
| 2009/0072963 A1 | 3/2009 | Langer | |
| 2009/0141939 A1 | 6/2009 | Chambers | |
| 2009/0284578 A1 | 11/2009 | Carter | |
| 2010/0087161 A1 | 4/2010 | Young | |
| 2010/0141761 A1 * | 6/2010 | McCormack | 348/143 |
| 2010/0195810 A1 * | 8/2010 | Mota et al. | 379/167.12 |
| 2011/0260880 A1 * | 10/2011 | Dean et al. | 340/686.1 |
| 2012/0105631 A1 * | 5/2012 | Hutchings | 348/143 |
| 2012/0113253 A1 | 5/2012 | Slater | |
| 2012/0162416 A1 | 6/2012 | Su | |
| 2012/0230696 A1 * | 9/2012 | Pederson et al. | 398/115 |
| 2012/0262581 A1 | 10/2012 | Carter | |
| 2012/0280783 A1 | 11/2012 | Gerhardt | |
| 2012/0280789 A1 | 11/2012 | Gerhardt | |
| 2012/0280790 A1 | 11/2012 | Gerhardt | |
| 2013/0045763 A1 | 2/2013 | Ruiz | |
| 2013/0050495 A1 | 2/2013 | Chen | |
| 2013/0057695 A1 | 3/2013 | Huisking | |
| 2013/0094444 A1 | 4/2013 | Lai | |
| 2013/0130749 A1 | 5/2013 | Andersen | |
| 2013/0169814 A1 | 7/2013 | Liu | |
| 2014/0203939 A1 | 7/2014 | Harrington | |
| 2014/0273892 A1 | 9/2014 | Nourbakhsh | |

FOREIGN PATENT DOCUMENTS

| | | |
|---|---|---|
| CN | 202939738 U | 5/2013 |
| EP | 684743 B1 | 7/1999 |
| GB | 2400958 | 10/2004 |
| WO | WO 01/93220 A1 | 12/2001 |

OTHER PUBLICATIONS

August Smart Lock—Part 2—downloaded on Jun. 10, 2014 from www.August.com.

August Smart Lock—Part 3—downloaded on Oct. 10, 2014 from www.August.com.

Kevo Lock—User guide—downloaded on Jun. 10, 2014 from http://s7d5.scene7.com/is/content/BDHHI/Kwikset/Website%20Content/Kevo/kevo-userguide-kwikset_eng.pdf.

Kevo Lock—Installation guide—downloaded on Oct. 10, 2014 from http://s7d5.scene7.com/is/content/BDHHI/Kwikset/Website%20Content/Kevo/installation_guide.pdf.

Schlage Electronic Lock—User guide—downloaded on Jun. 10, 2014 from www.schlage.com.

Lock-Style Solenoid—Downloaded on Aug. 22, 2014 from www.AdaFruit.com.

Power Matters Alliance—Downloaded on Aug. 23, 2014 from www.wikipedia.com.

Push-Pull Solenoid—Downloaded on Aug. 22, 2014 from www.AdaFruit.com.

Push-Pull Solenoid—Technical Details—Downloaded on Aug. 22, 2014 from www.AdaFruit.com.

Qi—Downloaded on Aug. 23, 2014 from www.wikipedia.com.

TP-Link—Website—Downloaded on Jul. 15, 2014 from www.tp-link.us.

TP-Link—User guide—downloaded on Jul. 15, 2014 from www.tp-link.us.

AC Adapter Spy Camera—Downloaded on Jun. 24, 2014 from ahdcameras.com.

FanFare Chime—Downloaded on Oct. 10, 2014 from https://www.kickstarter.com/projects/1040187373/1919517395?token=47099d90.

Ring Video Doorbell—Downloaded on Oct. 10, 2014 from www.ring.com.

Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.

Amazon.com Listing: "Philips InSight Wireless HD Baby Monitor," downloaded Jul. 24, 2013 from http://www.amazon.com/Philips-InSight-Wireless-Baby-Monitor/dp/B00AALO9Z6/ref=sr_1_

(56) References Cited

OTHER PUBLICATIONS

2?ie=UTF8&qid=1374704204&sr=8-2&keywords=philips+insight+wi-fi+baby+monitor.
Cellnock.com Listing: "CellNock," downloaded Sep. 23, 2013 from http://cellnock.com/products.htm.
Cellnock.com Listing: "CellNock Index," downloaded Sep. 23, 2013 from http://cellnock.com/index.html.
Christiestreet.com Listing: "DoorBot," downloaded Jun. 14, 2013 from https://christiestreet.com/products/doorbot.
Idoorcam.com: "iDoorCam—A Wi-Fi Enabled, Webcam Doorbell," downloaded Sep. 3, 2013 from http://www.idoorcam.com/.
Indiegogo.com Listing: "Squaritz IDS—Intelligent Doorbell System," originally downloaded Aug. 15, 2013 from http://www.indiegogo.com/projects/squaritz-ids-intelligent-doorbell-system.
Indiegogo.com Listing: "wireless video doorbell pager," downloaded Aug. 9, 2013 from http://www.indiegogo.com/projects/wireless-video-doorbell-pager--4.
Lockitron.com Listing: "Lockitron," downloaded Jul. 24, 2013 from https://lockitron.com/preorder.
Revolutionary Concepts, Inc. Listing: "Eyetalk for Home," originally downloaded May 24, 2013 from http://www.revolutionaryconceptsinc.com/forhome.html.
DoorBot—Downloaded on Jul. 26, 2013 from http://www.getdoorbot.com.
Langer Doorbell Button Sized Light—Downloaded on Sep. 16, 2013 from http://www.youtube.com/watch?v=u9nNCm4tSYI.
Langer Doorbell Light—Downloaded on Sep. 16, 2013 from http://www.youtube.com/watch?v=6dbU-Gyjgx8.
SmartBell on Kickstarter—Downloaded on Feb. 28, 2014 from http://www.kickstarter.com/projects/1256599792/smartbell-wi-fi-doorbell-for-video-chats-to-ios-an.
Doorbot: Downloaded on Nov. 18, 2013 from http://www.craigncompany.com/home-tech-doorbot/; prior art publication at least as of Jun. 10, 2013.
Doorbot: Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Doorbot: Downloaded on Nov. 18, 2013 from http://www.digitaltrends.com/lifestyle/doorbot-camera-see-visitors-smartphone/; prior art publication at least as of Dec. 9, 2012.
Doorbot website: Downloaded on Nov. 18, 2013 from http://www.getdoorbot.com/.
Doorbot users manual: Downloaded on Nov. 18, 2013 from http://static.mydoorbot.com/DoorBot%20Users%20Manual%201.0.pdf.
Doorbot "fact sheet": Downloaded on Nov. 18, 2013 from http://cdn.shopify.com/s/files/1/0247/6501/files/DoorBotMediaKit.pdf?17037.
Doorbot "features kit": Downloaded on Nov. 18, 2013 from http://cdn.shopify.com/s/files/1/0247/6501/files/DoorBot_Features_Kit.pdf?17037.
CellNock index page: Originally downloaded on Sep. 23, 2013 from http://cellnock.com/index.html; The website says CellNock is "patent pending."
CellNock about founder page: Downloaded on Nov. 18, 2013 from http://cellnock.com/index.html; The website says CellNock is "patent pending."
CellNock learn more page: Downloaded on Nov. 18, 2013 from http://cellnock.com/learn_more.htm; The website says CellNock is "patent pending."
CellNock product page: Downloaded on Nov. 18, 2013 from http://cellnock.com/products.htm; The website says CellNock is "patent pending."
Philips InSight Baby Monitor: Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
MySkyBell.com—Part 1 (previously iDoorCam.com): Downloaded on Nov. 18, 2013 from http://www.myskybell.com/.
MySkyBell.com—Part 2 (previously iDoorCam.com): Downloaded on Nov. 18, 2013 from http://www.myskybell.com/.
MySkyBell.com—Part 3 (previously iDoorCam.com): Downloaded on Nov. 18, 2013 from http://www.myskybell.com/.
MySkyBell.com—Part 4 (previously iDoorCam.com): Downloaded on Nov. 18, 2013 from http://www.myskybell.com/.
MySkyBell.com—Part 5 (previously iDoorCam.com): Downloaded on Nov. 18, 2013 from http://www.myskybell.com/.
Squaritz IDS Doorbell System—Downloaded on Aug. 15, 2013 from http://www.indiegogo.com/projects/squaritz-ids-intelligent-doorbell-system.
MyBells—Downloaded on Nov. 18, 2013 from http://www.indiegogo.com/projects/mybells-the-smart-bells.
Wireless video doorbell pager—Downloaded on Aug. 9, 2013 from http://www.indiegogo.com/projects/wireless-video-doorbell-pager--4.
Lockitron—Downloaded on Jul. 24, 2013 from https://lockitron.com/preorder.
EyeTalk for home—Downloaded on May 2013 from http://www.revolutionaryconceptsinc.com/forhome.html.
EyeTalk Product—Downloaded on Nov. 18, 2013 from http://www.revolutionaryconceptsinc.com/eyetalk.html.
Langer Doorbell Light—Downloaded on Nov. 18, 2013 from http://www.youtube.com/watch?v=u9nNCm4tSYl; published at least as early as Apr. 2013.
SmartBell—Downloaded on Dec. 5, 2013 from http://smartbell.co/This_is_smartbell.html.
SmartBell—Downloaded on Dec. 5, 2013 from http://smartbell.co/Tech_specs.html.
SmartBell—Downloaded on Dec. 5, 2013 from http://smartbell.co/FAQ.html.
SmartBell—A Doorbell for Smartphones, published by Scrambled Brains Tech, LLC., Oct. 1, 2013.

* cited by examiner 650 light socket
614 screw thread contact 650 light socket 656 light bulb

LIGHT SOCKET CAMERAS

CROSS-REFERENCE TO RELATED APPLICATIONS

This application claims the benefit of and is a continuation-in-part of Nonprovisional patent application Ser. No. 14/469,583; filed Aug. 27, 2014; and entitled SMART LOCK SYSTEMS AND METHODS; the entire contents of which are incorporated herein by reference. U.S. Nonprovisional patent application Ser. No. 14/469,583 claims the benefit of U.S. Provisional Patent Application No. 61/872,439; filed Aug. 30, 2013; and entitled DOORBELL COMMUNICATION SYSTEMS AND METHODS; the entire contents of which are incorporated herein by reference. U.S. Nonprovisional patent application Ser. No. 14/469,583 claims the benefit of and is a continuation-in-part of U.S. Nonprovisional patent application Ser. No. 14/099,888; filed Dec. 6, 2013; and entitled DOORBELL COMMUNICATION SYSTEMS AND METHODS, which issued as U.S. Pat. No. 8,823,795 on Sep. 2, 2014; the entire contents of which are incorporated herein by reference. U.S. Nonprovisional patent application Ser. No. 14/469,583 claims the benefit of and is a continuation-in-part of U.S. Nonprovisional patent application Ser. No. 14/142,839; filed Dec. 28, 2013; and entitled DOORBELL COMMUNICATION SYSTEMS AND METHODS, which issued as U.S. Pat. No. 8,842,180 on Sep. 23, 2014; the entire contents of which are incorporated herein by reference.

This application claims the benefit of and is a continuation-in-part of U.S. Nonprovisional patent application Ser. No. 14/275,811; filed May 12, 2014; and entitled DOORBELL COMMUNICATION SYSTEMS AND METHODS; the entire contents of which are incorporated herein by reference. U.S. Nonprovisional patent application Ser. No. 14/275,811 claims the benefit of and is a continuation-in-part of U.S. Nonprovisional patent application Ser. No. 14/098,772; filed Dec. 6, 2013; and entitled DOORBELL COMMUNICATION SYSTEMS AND METHODS, which issued as U.S. Pat. No. 8,780,201 on Jul. 15, 2014; the entire contents of which are incorporated herein by reference. U.S. Nonprovisional patent application Ser. No. 14/275,811 claims the benefit of U.S. Provisional Patent Application No. 61/859,070; filed Jul. 26, 2013; and entitled DOORBELL COMMUNICATION SYSTEMS AND METHODS; the entire contents of which are incorporated herein by reference.

This application claims the benefit of and is a continuation-in-part of U.S. Nonprovisional patent application Ser. No. 14/463,548; filed Aug. 19, 2014; and entitled DOORBELL COMMUNICATION SYSTEMS AND METHODS; the entire contents of which are incorporated herein by reference.

This application claims the benefit of U.S. Provisional Patent Application No. 62/039,394; filed Aug. 19, 2014; and entitled LIGHT SOCKET CAMERAS; and U.S. Provisional Patent Application No. 62/018,605; filed Jun. 29, 2014; and entitled LIGHT SOCKET CAMERAS; the entire contents of which are incorporated herein by reference.

BACKGROUND

1. Technical Field

Various embodiments disclosed herein relate to devices and methods that enable people to observe remote locations. Certain embodiments relate to using a computing device to see video taken by a remotely located camera.

2. Description of Related Art

Video cameras can record images of various events that are viewable by remotely located people. Additionally, video cameras can be supported by objects such as tripods. Furthermore, video cameras often require electrical power. Some video cameras receive electrical power from batteries and/or power outlets.

SUMMARY

The disclosure describes methods for using a security system to detect a visitor. Methods can include obtaining the security system that comprises a speaker, a microphone, and a camera, using the security system to detect the visitor, using the camera to take a video of the visitor, transmitting the video of the visitor from the security system to a remote computing device, and displaying the video of the visitor on the remote computing device.

The security system can include a proximal end and a distal end that is opposite the proximal end. The camera can be located at the distal end of the security system. The security system can include a foot contact located at the proximal end of the security system. Methods can include orienting the security system such that the foot contact of the security system faces a foot contact of a light socket, wherein the distal end of the security system faces away from the foot contact of the light socket, and wherein the camera faces away from the foot contact of the light socket. Methods can also include attaching the security system to the light socket, and electrically coupling the foot contact of the security system to the foot contact of the light socket.

Methods can also include moving the camera in a distal direction that is away from the distal and proximal ends of the security system. The camera can be mechanically and electrically coupled to the security system after moving the camera along the distal direction. The camera can be positioned at a vertical location such that the camera is able to see a vertical field of vision of at least 250 degrees. The camera can be configured to see a horizontal field of vision of 360 degrees.

In some embodiments the light socket is located in a room inside a building. Accordingly, methods can further include using the security system to determine whether the visitor is authorized to be located in the room. In response to determining that the visitor is not authorized to be located in the room, methods can include using the security system to transmit an alert to the remote computing device. The alert can notify a user of the remote computing device that the visitor is not authorized to be located in the room.

Some embodiments can include using the security system to determine an identity of the visitor. The security system can determine the identity of the visitor via facial recognition.

In response to determining that the visitor is not authorized to be located in the room, methods can further include using the security system to broadcast a predetermined audible message, via the speaker in the security system, to notify the visitor that the visitor is not authorized to be located in the room.

Some embodiments can further include transmitting a first audible message to the visitor. The first audible message can be received by a microphone in the remote computing device and transmitted to the security system. As well, the first audible message can be audibly transmitted to the visitor via the speaker in the security system. Methods can further include transmitting a second audible message to a user of the remote computing device. The second audible message can be received by the microphone in the security system and transmitted to the remote computing device. The second audible message can be audibly transmitted to the user via a speaker in the remote computing device.

The security system can include a motion detector configured to detect the visitor. The motion detector can be located at the distal end of the security system such that the motion detector faces away from the foot contact. The security system can include a light configured to illuminate at least a portion of a field of vision of the camera. The light can be located at the distal end of the security system. Methods can further include using the motion detector to detect the visitor, using the security system to determine whether the field of vision of the camera is illuminated, and in response to detecting the visitor and in response to determining that the field of vision is not illuminated, methods can include illuminating the light and using the camera to record a video of the visitor.

The security system can include a light configured to illuminate at least a portion of a field of vision of the camera. The method can further include receiving a first instruction from the remote computing device. The first instruction can comprise a command to illuminate the light. In response to receiving the first instruction from the remote computing device, methods can include using the security system to illuminate the light. As well, methods can include receiving a second instruction from the remote computing device, wherein the second instruction comprises a command to de-activate the light, and in response to receiving the second instruction from the remote computing device, methods can include using the security system to de-activate the light. Methods can include receiving a first audible instruction via the microphone of the security system. The first audible instruction can include the command to illuminate the light. In response to receiving the first audible instruction from the visitor, methods can include using the security system to illuminate the light. Methods can include receiving a second audible instruction via the microphone of the security system. The second audible instruction can include the command to de-activate the light. In response to receiving the second audible instruction from the visitor, methods can include using the security system to de-activate the light.

The security system can include a proximal end, a distal end that is opposite the proximal end, and a sidewall that extends between the proximal end and the distal end. The security system can include a foot contact located at the proximal end of the security system. The security system can include a motion detector configured to detect the visitor. The motion detector can be located at the distal end of the security system such that the motion detector faces away from the foot contact. The sidewall can include a first portion and a second portion that is distal to the first portion. The second portion can be rotatable about the first axis. Methods can include orienting the security system such that the proximal end of the security system faces a foot contact of a light socket. The distal end of the security system can face away from the foot contact of the light socket. Methods can also include rotating the security system about a first axis to thereby attach the security system to the light socket. The security system can be attached to the light socket such that the camera faces a radial direction that is perpendicular to the first axis. Methods can also include electrically coupling the foot contact of the security system to the foot contact of the light socket. Methods can include using the motion detector to detect the visitor, and in response to detecting the visitor, methods can include using the security system to determine whether the visitor is located within a field of vision of the camera. In response to determining that the visitor is not within the field of vision of the camera, methods can include using the security system to rotate the second portion such that the camera rotates about the first axis until the visitor is within a field of vision of the camera.

Some methods further include using the security system to receive an instruction from a remote computing device. The instruction can include a command to rotate the second portion. In response to receiving the instruction from the remote computing device, methods can include using the security system to rotate the second portion such that the camera rotates about the first axis.

This disclosure also includes a security system configured to record a video of a visitor. The security system can include an outer housing comprising a proximal end, a distal end that is opposite the proximal end, and a sidewall that extends between the proximal end and the distal end, a camera coupled to the outer housing. The camera can be configured to record a video of the visitor. The security system can also include a speaker located within an internal portion of the outer housing. The speaker can be configured to transmit an audible message to the visitor. The security system can also include a microphone located within an internal portion of the outer housing. The microphone can be configured to receive an audible message. The security system can also include a communication module located within an internal portion of the outer housing. The communication module can be configured to connect to a wireless communication network. As well, the security system can include a screw thread contact having a proximal end, a distal end that is opposite the proximal end, and a threaded sidewall that extends between the proximal end and the distal end of the screw thread contact. The distal end of the screw thread contact can be located adjacent the proximal end of the outer housing. The screw thread contact can be configured to be rotatably attached to a light socket. The security system can also include a foot contact located at the proximal end of the screw thread contact. The foot contact can be configured to be electrically coupled to a foot contact of the light socket.

The security system can further include the light socket. The light socket can be coupled to a building. The screw thread contact can be rotatably attached to the light socket. The foot contact of the security system can be electrically coupled to the foot contact of the light socket. The security system can include an infrared light located at the distal end of the outer housing. The infrared light can be configured to illuminate at least a portion of a field of vision of the camera. The security system can also include a light emitting diode located at the distal end of the outer housing. The light emitting diode can be configured to illuminate at least a portion of the field of vision of the camera.

The security system can be configured to rotate about a first axis to thereby couple the screw thread contact to the light socket such that the security system is coupled to the light socket. The sidewall can include a first portion and a second portion that is distal to the first portion. The second portion can be rotatable about the first axis. The camera can be located along the second portion such that the camera faces a radial direction that is perpendicular to the first axis The security system can be configured to receive a command from the remote computing device to rotate the second portion. The second portion can be configured to rotate in response to the command from the remote computing device.

The security system can further include a motion detector configured to detect the presence of the visitor. The motion detector can be located at the distal end of the outer housing. The security system can be configured to automatically detect the presence of the visitor via the motion detector. The security system can be configured to determine whether the visitor is located within a field of vision of the camera. The security system can be configured to automatically rotate the second portion to thereby rotate the camera until the visitor is located within the field of vision of the camera.

The camera can be located at the distal end of the outer housing. The camera can be oriented such that the camera faces away from the foot contact. The security system can further include a cone-shaped mirror coupled to the distal end of the security system such that a tip of the cone-shaped mirror faces the camera and faces towards the foot contact. The cone-shaped mirror can enable the camera to see a field of vision that covers at least 330-degrees.

The outer housing of the security system can be sealed such that the speaker, microphone, and communication module are protected from moisture and contaminants.

The light socket can be located in a room inside a building. The security system can be configured to identify the visitor and determine whether the visitor is authorized to be located in the room. The security system can be configured to transmit an alert to the remote computing device to notify the user whether the visitor is not authorized to be located in the room.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

System Embodiments

Communication systems can provide a secure and convenient way for a remotely located individual to see and/or communicate with a person who is within the field of vision of a camera and/or within the range of a microphone. Communication systems can include a camera that is attached to a light socket to couple the camera to a wall and to provide electricity to the camera.

Some communication systems can allow an individual to hear, see, and talk with visitors. For example, communication systems can use a computing device to enable a remotely located person to see, hear, and/or talk with visitors. Computing devices can include computers, laptops, tablets, mobile devices, smartphones, cellular phones, and wireless devices (e.g., cars with wireless communication). Specifically, example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1A:
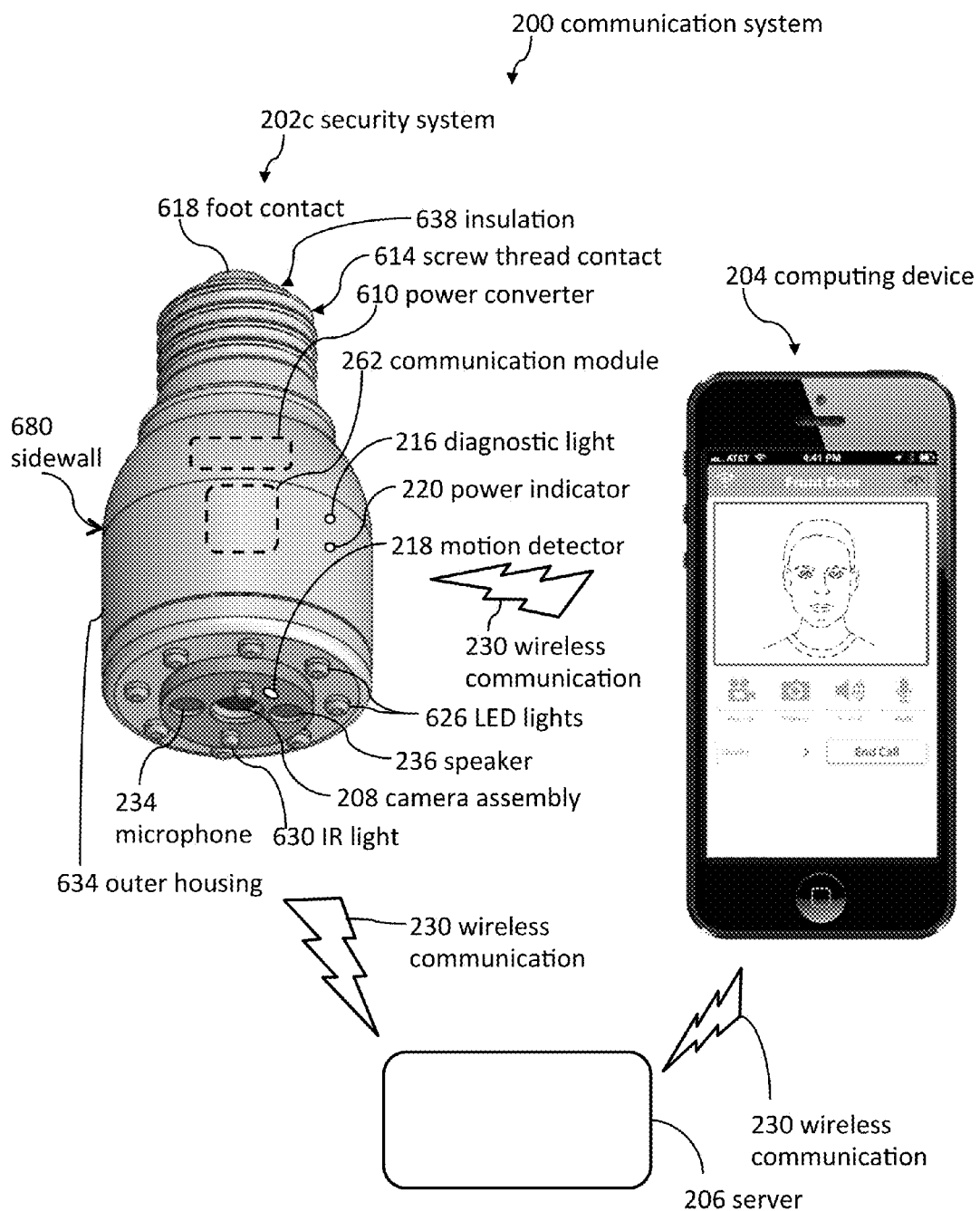
FIG. 1a illustrates a front view of a communication system, according to some embodiments.

Referring now to FIG. 1a, communication systems 200 can be a portion of a smart home hub. Communication systems 200 can facilitate home automation. In some cases, cameras 208 are electrically coupled to a light socket of a building 300 and are integrated into a holistic home automation system and/or home security system. Various systems described herein enable home surveillance and/or complete home automation. Cameras 208 threadably screwed into an interior light socket can enable a remote user to see events inside of a building 300 (shown in FIG. 3). As well, cameras 208 threadably screwed into exterior light sockets can enable a remote user to see events outside of a building 300.

In some embodiments, the security system 202c controls various electrical items in a home (e.g., lights, air conditioners, heaters, motion sensors, garage door openers, locks, televisions, computers, entertainment systems, appliances, pool monitors, elderly monitors, and the like). In some embodiments, the computing device 204 controls the security system 202c and other electrical items in a home (e.g., lights, air conditioners, heaters, motion sensors, garage door openers, locks, televisions, computers, entertainment systems, appliance, pool monitors, elderly monitors, and the like).

FIG. 1 illustrates a front view of a communication system embodiment. The communication system 200 can include a security system 202c (e.g., a camera assembly) and a computing device 204. Although the illustrated security system 202c includes many components in one housing, several security system embodiments include components in separate housings. The security system 202c can include a camera assembly 208. The camera assembly 208 can include a video camera, which in some embodiments is a webcam. The camera assembly 208 can be configured to take videos of a surrounding area for viewing via the Internet. However, it should be appreciated that the camera assembly 208 can be a still camera, any type of digital camera, virtual camera, and the like. Generally, it should be appreciated that the camera assembly 208 can be any type of camera or optical instrument that records images that can be stored directly, transmitted to another location, or both.

Figure 1B:
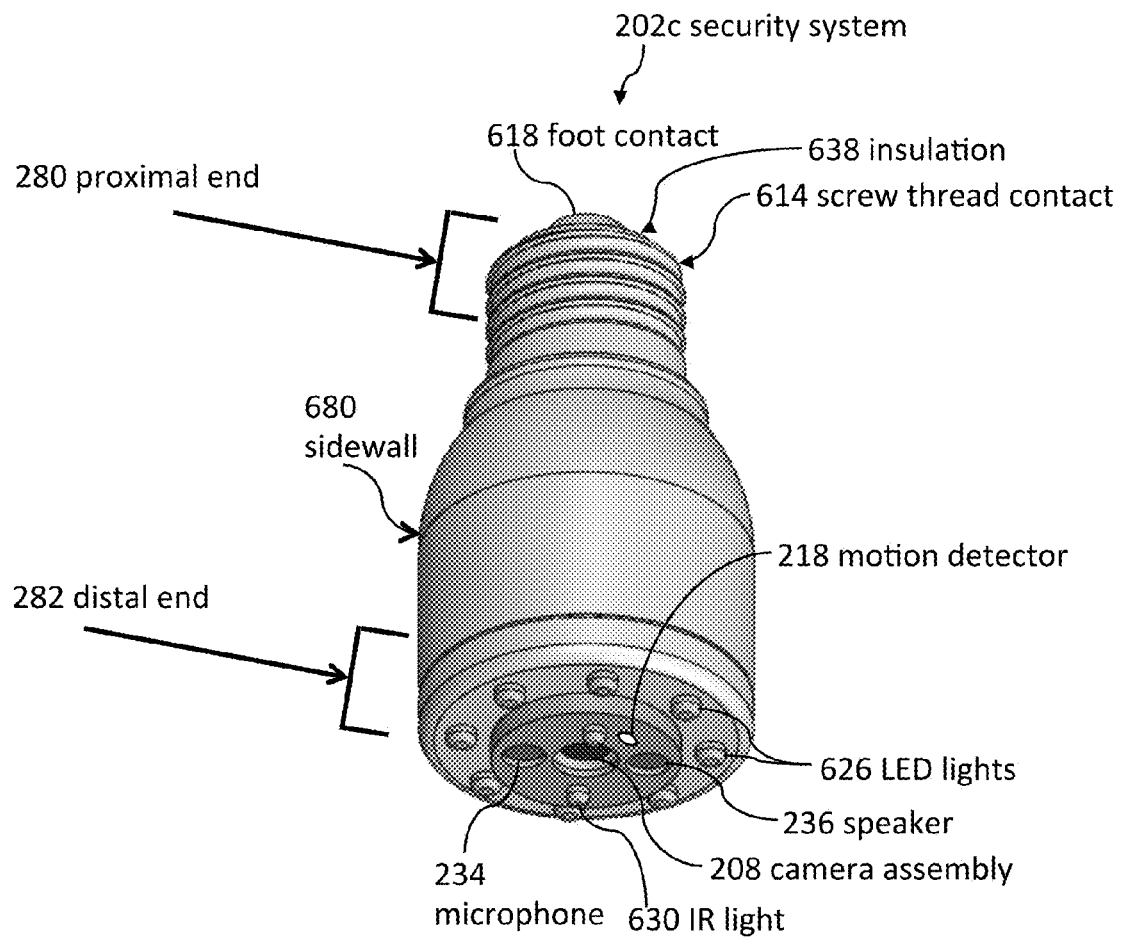
FIG. 1b illustrates a front view of a security system, according to some embodiments.

Now with added reference to FIG. 1b, the security system 202c can include a proximal end 280 and a distal end 282 that is opposite the proximal end 280. The camera assembly 208 can be located at the distal end 282 of the security system 202c. However, it should be appreciated that the camera assembly 208 can be positioned at any location on the security system 202c, such as the sidewall 680. The security system 202c can also include a foot contact 618 located at the proximal end 280 of the security system 202c.

It should be appreciated that the security system 202c can include more than one camera assembly 208. For example, the security system 202c may include two cameras. In some embodiments, the security system 202c includes a first camera disposed at the distal end 282 of the security system 202c, and a second camera disposed along the sidewall 680 of the security system 202c. In this manner the second camera may face perpendicular to the direction the first camera is facing. This may allow the security system 202c to have a larger field of vision of the area to which the security system 202c is monitoring.

Moreover, the security system 202c can also include a third camera, a fourth camera, and a fifth camera. The cameras can be mounted at any location along the security system 202c to thereby expand the field of vision of the security system 202c. As well, the camera(s) 208 may be configured to move away from the security system 202c and pivot along at least two axes. The movement of the camera(s) 208 may be controlled via manual manipulation by a person, a command from a remote computing device 204, automatically in response to the occurrence of an event, or the like.

As shown in FIG. 1a, the security system 202c can include a diagnostic light 216 and a power indicator light 220. In some embodiments, the diagnostic light 216 is a first color (e.g., blue) if the security system 202c and/or the communication system 200 is connected to a wireless Internet network and is a second color (e.g., red) if the security system 202c and/or the communication system 200 is not connected to a wireless Internet network. In some embodiments, the power indicator 220 is a first color if the security system 202c is connected to a power source. The power source can be power supplied by the building 300 to which the security system 202c is attached. The security system 202c can receive electricity via the light socket to which the security system 202c is attached. In some embodiments, the power indicator 220 is a second color or does not emit light if the security system 202c is not connected to the power source.

The security system 202c (e.g., a camera assembly) can include an outer housing 634, which can be water resistant and/or waterproof. The outer housing 634 can be made from metal or plastic, such as molded plastic with a hardness of 60 Shore D. In some embodiments, the outer housing 634 is made from brushed nickel or aluminum. The outer housing 634 can be rigid.

Rubber seals can be used to make the outer housing 634 water resistant or waterproof. The security system 202c can be electrically coupled to a power source, such as wires electrically connected to a building's electrical power system. In some embodiments, the security system 202c includes a battery for backup and/or primary power.

As shown in FIG. 1, the security system 202c can include a screw thread contact 614 having a proximal end adjacent the foot contact 618 and a distal end that is opposite the proximal end. The distal end of the screw thread contact 614 can be located adjacent the proximal end of the outer housing 634. The screw thread contact 614 can also include a threaded sidewall that extends between the proximal end and the distal end of the screw thread contact 614. In this manner, the threaded sidewall of the screw thread contact 614 can be configured to rotatably attach to the light socket 650.

The security system can include lights 626, which can be LED lights configured to illuminate a room and/or an outdoor area. In some embodiments, the lights 626 can provide at least 10 lumens, at least 1,000 lumens, at least 4,000 lumens, and/or less than 40,000 lumens. The lights 626 can be aligned such that the lights 626 are parallel to a central axis 266 of a screw thread contact 614. The lights 626 can be oriented such that they face away from the foot contact 618.

As well, the security system 202c can include lights 630, which can be infrared lights. The lights 630 can illuminate an area in front of the camera assembly's 208 field of vision to enable the camera assembly 208 to capture easily viewable and high-quality video. In this regard, the lights 630 can be located at the distal end 282 of the security system 202c, adjacent to the camera assembly 208. Infrared light can be suitable for nighttime video recording. In some embodiments the security system 202c includes a photosensor and/or a photodetector to determine whether the field of vision of the camera assembly 208 is illuminated. In response to determining that the field of vision is not illuminated, the security system 202c can illuminate the light and use the camera assembly 208 to record a video of the visitor. It should be appreciated that the security system 202c can include any type of sensor configured to determine an amount of light, such as a reverse-biased light emitting diode (LED), photovoltaic cell, photodiode, ultraviolet light sensor, and the like.

The lights 626 and 630 can be controlled by any number of means. For example, the security system 202c can be configured to receive a first instruction from the remote computing device 204. The first instruction can include a command to illuminate either or both of the lights 626 and/or 630. In response to receiving the first instruction from the remote computing device 204, the security system 202c can illuminate the lights 626 and/or 630. As well, the security system 202c can receive a second instruction from the remote computing device 204. The second instruction can include a command to de-activate the lights 626 and/or 630. Accordingly, in response to receiving the second instruction from the remote computing device 204, the security system 202c can de-activate the lights 626 and/or 630.

The security system 202c can also be configured to illuminate and de-activate the lights 626 and/or 630 in a number of different manners. For example, the security system 202c can be configured to receive an audible instruction via the microphone 234 of the security system 202c. The audible instruction can be a spoken command by the visitor to thereby illuminate and/or de-activate the lights 626 and/or 630. For example, the audible instruction can be the visitor saying, "Turn lights on," "Illuminate lights," "Lights off," "Dim lights," and the like. Generally, the audible instruction can be any spoken command or noise from the visitor, which is thereby received by the security system 202c to illuminate the lights. Accordingly, in response to receiving the audible instruction from the visitor, the security system 202c can illuminate or de-activate the lights 626 and/or 630.

As well, the security system 202c can include a communication module 262 configured to enable wireless communication with the computing device 204. The communication module 262 can include a WiFi antenna and can be configured to enable the security system 202c to connect to a wireless network 308 of a building 300 (shown in FIG. 3).

Wireless communication 230 can enable the security system 202c (e.g., a camera assembly) to communicate with the computing device 204. Accordingly, the security system 202c may include a communication module 262 located within an internal portion of the outer housing 634. The communication module 262 may be configured to connect to a wireless communication network. Some embodiments enable communication via cellular and/or WiFi networks. Some embodiments enable communication via the Internet. Several embodiments enable wired communication between the security system 202c and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the security system 202c can initiate voice calls or transmit text messages to a computing device 204 (e.g., a smartphone, a desktop computer, a tablet computer, a laptop computer).

Several embodiments use near field communication (NFC) to communicate between the computing device 204 and the security system 202c. The security system 202c and/or the computing device 204 can include a NFC tag. Some NFC technologies include Bluetooth, radio-frequency identification, and QR codes.

Several embodiments include wireless charging (e.g., near field charging, inductive charging) to supply power to and/or from the security system 202c and the computing device 204. Some embodiments use inductive charging (e.g., using an electromagnetic field to transfer energy between two objects).

Some embodiments include computer software (e.g., application software), which can be a mobile application designed to run on smartphones, tablet computers, and other mobile devices. Software of this nature is sometimes referred to as "app" software. In some embodiments the computer software includes software designed to run on desktop computers and laptop computers.

The computing device 204 can run software with a graphical user interface. The user interface can include icons or buttons. In some embodiments, the software is configured for use with a touch-screen computing device such as a smartphone or tablet.

The security system 202c can include a motion detector 218 configured to detect the presence of people (e.g., in the outdoor area or room in which the security system 202c is located) or objects. The security system 202c can also be placed outdoors to detect people or objects outside. The motion detector 218 can be an infrared motion detector.

Figure 3:
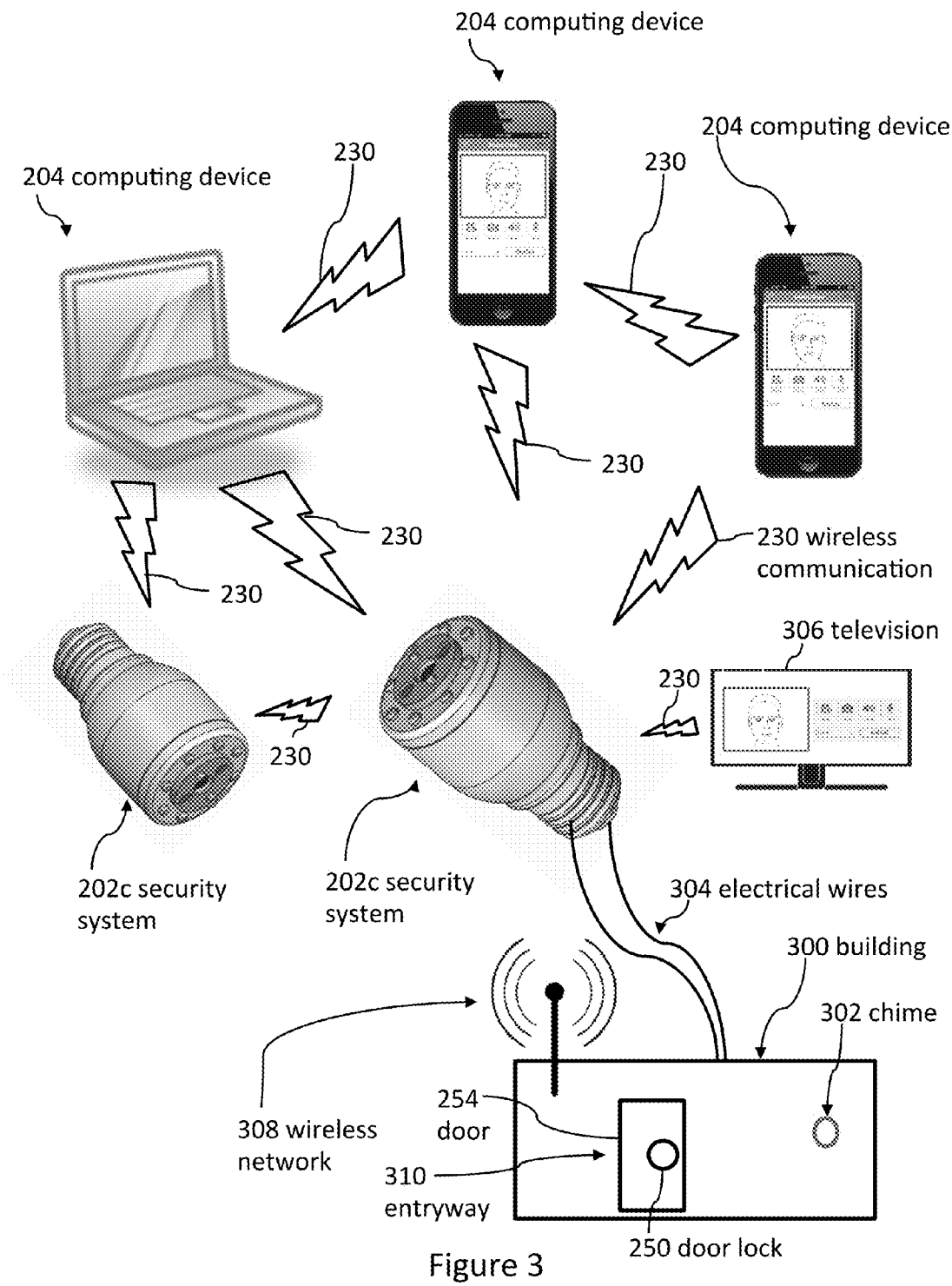
FIG. 3 illustrates an embodiment in which a security system is connected to a building, according to some embodiments.

As illustrated in FIGS. 6-10, the security system 202c can be attached to a light socket 650 to couple the security system 202c to an electrical power source (e.g., of a building 300 shown in FIG. 3). The security system 202c can include a screw thread electrical contact 614, which can comprise a conductive metal. The security system 202c can also include a foot electrical contact 618, which can comprise a conductive metal. The screw thread contact 614 can be electrically insulated from the foot electrical contact 618 by insulation 638.

The security system 202c can be coupled to the light socket 650 via any number of connection methods. For example, the screw thread contact 614 of the security system 202c can be rotatably attached to the light socket 650 to thereby couple the security system 202c to the light socket 650. When the security system 202c is coupled to the light socket 650, the foot contact 618 of the security system 202c can be electrically coupled to the foot contact 654 of the light socket 650, to thereby couple the security system 202c to the electrical power source (i.e. to energize the security system 202c).

A power converter 610 can be electrically coupled to the screw thread contact 614 and the foot contact 618. The power converter 610 can be configured to convert electricity from the building 300 (shown in FIG. 3) to a type of power that is more suitable for the security system 202c. In some embodiments, the power converter 610 converts an input voltage to a lower voltage and/or converts AC to DC power. Furthermore, it should be appreciated that the power converter 610 can be configured to adapt to the input voltages of any country, and thereby convert the input voltage to a voltage suited for the security system 202c.

Figure 2:
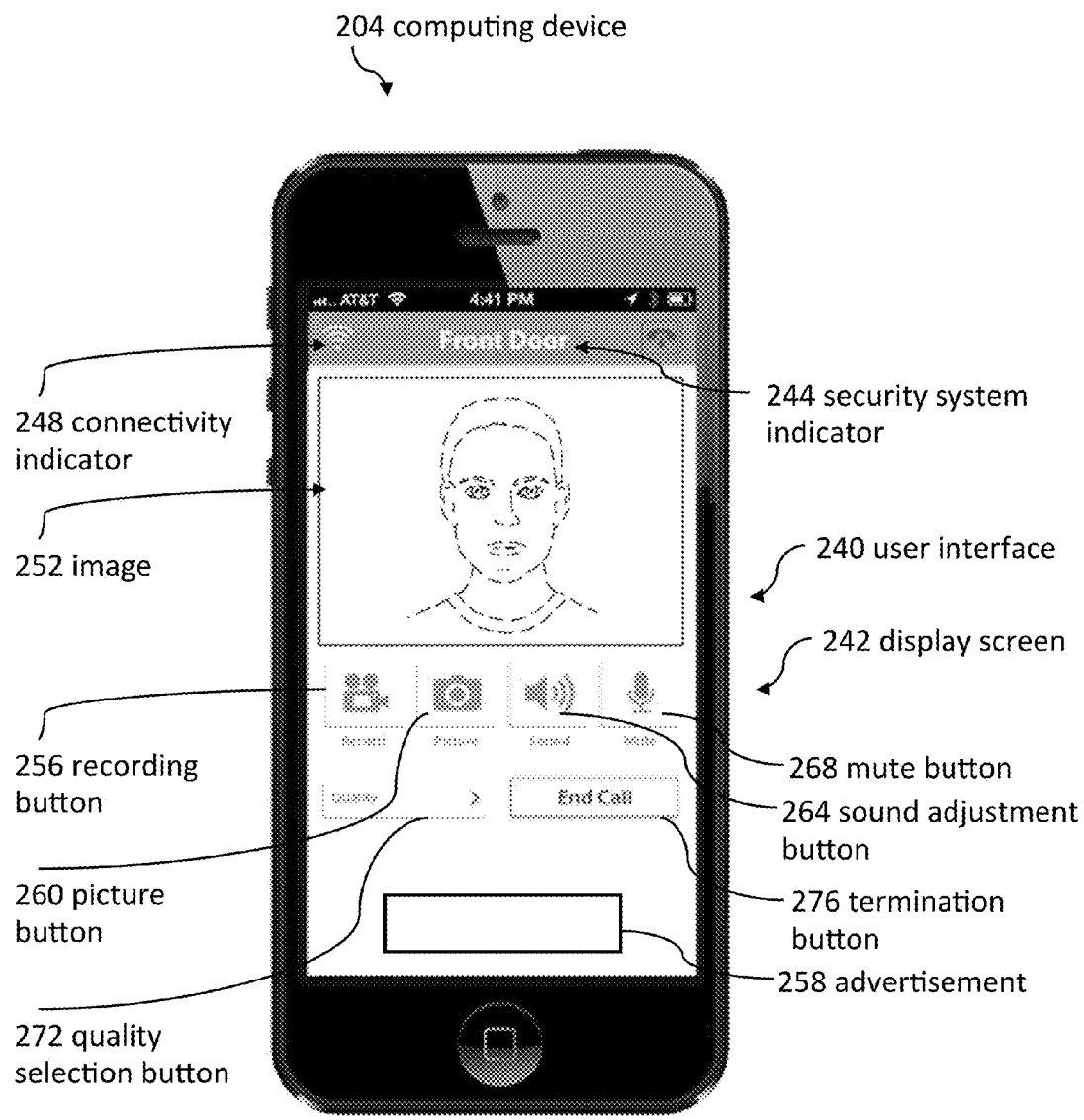
FIG. 2 illustrates a computing device running software, according to some embodiments.

FIG. 2 illustrates a computing device 204 running software. The software includes a user interface 240 displayed on a display screen 242. The user interface 240 can include a security system indicator 244, which can indicate the location of the security system that the user interface is displaying. For example, a person can use one computing device 204 to control and/or interact with multiple security systems, such as one security system located at a front door and another security system located at a back door. Selecting the security system indicator 244 can allow the user to choose another security system (e.g., the back door security system rather than the front door security system).

The user interface 240 can include a connectivity indicator 248. In some embodiments, the connectivity indicator can indicate whether the computing device is in communication with a security system, the Internet, and/or a cellular network. The connectivity indicator 248 can alert the user if the computing device 204 has lost its connection with the security system 202c; the security system 202c has been damaged; the security system 202c has been stolen; the security system 202c has been removed from its mounting location; the security system 202c has lost electrical power; and/or if the computing device 204 cannot communicate with the security system 202c. In some embodiments, the connectivity indicator 248 alerts the user of the computing device 204 by flashing, emitting a sound, displaying a message, and/or displaying a symbol.

Referring now to FIG. 1a, in some embodiments, if the security system 202c loses power, loses connectivity to the computing device 204, loses connectivity to the Internet, and/or loses connectivity to a remote server, a remote server 206 transmits an alert (e.g., phone call, text message, image on the user interface 240) regarding the power and/or connectivity issue. In several embodiments, the remote server 206 can manage communication between the security system 202c and the computing device 204. In some embodiments, information from the security system 202c is stored by the remote server 206. In several embodiments, information from the security system 202c is stored by the remote server 206 until the information can be sent to the computing device 204, uploaded to the computing device 204, and/or displayed to the remotely located person via the computing device 204. The remote server 206 can be a computing device that stores information from the security system 202c and/or from the computing device 204. In some embodiments, the remote server 206 is located in a data center.

In some embodiments, the computing device 204 and/or the remote server 206 attempts to communicate with the security system 202c. If the computing device 204 and/or the remote server 206 is unable to communicate with the security system 202c, the computing device 204 and/or the remote server 206 alerts the remotely located person via the software, phone, text, a displayed message, and/or a website.

In some embodiments, the computing device 204 and/or the remote server 206 attempts to communicate with the security system 202c periodically; at least every five hours and/or less frequently than every 10 minutes; at least every 24 hours and/or less frequently than every 60 minutes; or at least every hour and/or less frequently than every second.

In some embodiments, the server 206 can initiate communication to the computer device 204 and/or to the security system 202c. In several embodiments, the server 206 can initiate, control, and/or block communication between the computing device 204 and the security system 202c.

In several embodiments, a user can log in to an "app," website, and/or software on a computing device (e.g., mobile computing device, smartphone, tablet, desktop computer) to adjust the security system settings discussed herein.

In some embodiments, a computing device can enable a user to watch live video and/or hear live audio from a security system due to the user's request rather than due to actions of a visitor. Some embodiments include a computing device initiating a live video feed (or a video feed that is less than five minutes old).

Referring now to FIG. 2, in some embodiments, the user interface 240 displays an image 252 such as a still image or a video of an area near and/or in front of the security system 202c. The image 252 can be taken by the camera assembly 208 and stored by the security system 202c, server 206, and/or computing device 204. The user interface 240 can include a recording button 256 to enable a user to record images, videos, and/or sound from the camera assembly 208, microphone of the security system 202c, and/or microphone of the computing device 204.

In several embodiments, the user interface 240 includes a picture button 260 to allow the user to take still pictures and/or videos of the area near and/or in front of the security system 202c. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system 202c to enable the camera assembly 208 to provide sufficient visibility (even at night).

In some embodiments, buttons include diverse means of selecting various options, features, and functions. Buttons can be selected by mouse clicks, keyboard commands, or touching a touch screen. Many embodiments include buttons that can be selected without touch screens.

In some embodiments, the user interface 240 includes a quality selection button, which can allow a user to select the quality and/or amount of data transmitted from the security system 202c to the computing device 204 and/or from the computing device 204 to the security system 202c.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

As shown in FIG. 2, the user interface 240 can include a termination button 276 to end communication between the security system 202c and the computing device 204. In some embodiments, the termination button 276 ends the ability of the person located near the security system 202c (i.e., the visitor) to hear and/or see the user of the computing device 204, but does not end the ability of the user of the computing device 204 to hear and/or see the person located near the security system 202c.

In some embodiments, a button 276 is both an answer button (to accept a communication request from a visitor) and a termination button (to end communication between the security system 202c and the computing device 204). The button 276 can include the word "Answer" when the system is attempting to establish two-way communication between the visitor and the user. Selecting the button 276 when the system is attempting to establish two-way communication between the visitor and the user can start two-way communication. The button 276 can include the words "End Call" during two-way communication between the visitor and the user. Selecting the button 276 during two-way communication between the visitor and the user can terminate two-way communication. In some embodiments, terminating two-way communication still enables the user to see and hear the visitor. In some embodiments, terminating two-way communication causes the computing device 204 to stop showing video from the security system and to stop emitting sounds recorded by the security system.

In some embodiments, the user interface 240 opens as soon as the security system 202c detects a visitor (e.g., senses indications of a visitor). Once the user interface 240 opens, the user can see and/or hear the visitor. The security system 202c can include a microphone 234 and a speaker 236 to enable the user to hear the visitor and to enable the visitor to hear the user. In this regard, the speaker 236 may be configured to transmit an audible message to the visitor and the microphone 234 may be configured to receive an audible message from the visitor. In some embodiments the speaker 236 and microphone 234 are located within an internal portion of the outer housing 634. However, in other embodiments, the speaker 236 and microphone 234 are located along an external surface of the outer housing 634. Thus, the security system 202c can enable the user to communicate with the visitor.

Some method embodiments include detecting a visitor with a security system. The methods can include causing the user interface 240 (shown in FIG. 2) to display on a remote computing device 204 due to the detection of the visitor (e.g., with or without user interaction). The methods can include displaying video from the security system and/or audio from the security system.

In some embodiments, the software includes means to start the video feed on demand. For example, a user of the computing device might wonder what is happening near the security system 202c. The user can open the software application on the computing device 204 and instruct the application to show live video and/or audio from the security device 202c even if no event near the security system 202c has triggered the communication.

In several embodiments, the security device 202c can be configured to record video, images, and/or audio when the security device 202c detects movement and/or the presence of a person. The user of the computing device 204 can later review all video, image, and/or audio records when the security device 202c detected movement and/or the presence of a person.

Referring now to FIG. 1a, in some embodiments, the server 206 controls communication between the computing device 204 and the security system 202c, which can include a camera, a microphone, and a speaker. In several embodiments, the server 206 does not control communication between the computing device 204 and the security system 202c.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the communication system 200 or from any part of the communication system 200. The user can download and/or stream stored data and/or storage video, pictures, and/or audio. For example, a user can record visitors for a year and then later can review the visits from the last year. In some embodiments, remote storage, the server 206, the computing device 204, and/or the security system 202c can store information and statistics regarding visitors and usage.

The communication system 200 can include the security system 202c, the computing device 204, and/or the server 206. Some communication systems use many systems to enable communication between the security system 202c and the computing device 204.

FIG. 3 illustrates an embodiment in which a security system 202c is connected to a building 300, which can include an entryway 310 that has a door 254. Electrical wires 304 can electrically couple the security system 202c to the electrical system of the building 300 such that the security system 202c can receive electrical power from the building 300 (e.g., via a light socket that is attached to the building 300).

A wireless network 308 can allow devices to wirelessly access the Internet. The security system 202c can access the Internet via the wireless network 308. The wireless network 308 can transmit data from the security system 202c to the Internet, which can transmit the data to remotely located computing devices 204. The Internet and wireless networks can transmit data from remotely located computing devices 204 to the security system 202c. In some embodiments, a security system 202c connects to a home's WiFi.

As illustrated in FIG. 3, one computing device 204 (e.g., a laptop, a smartphone, a mobile computing device, a television) can communicate with multiple security systems 202c. In some embodiments, multiple computing devices 204 can communicate with one security system 202c.

In some embodiments, the security system 202c can communicate (e.g., wirelessly 230) with a television 306, which can be a smart television. Users can view the television 306 to see a visitor and/or talk with the visitor.

As well, in some embodiments, the visitor and user of the remote computing device 204 are able to talk with each other, via the security system 202c and the remote computing device 204. For example, the security system 202c may be configured to transmit a first audible message to the visitor. The first audible message may be received by a microphone in the remote computing device 204 and transmitted to the security system 202c. In this regard, the first audible message may be audibly transmitted to the visitor via the speaker 236 in the security system 202c. As well, the security system may be configured to transmit a second audible message to a user of the remote computing device 202c. The second audible message may be received by the microphone 234 in the security system 202c and transmitted to the remote computing device. In this regard, the second audible message may audibly transmitted to the user via a speaker in the remote computing device 204.

Figure 4:
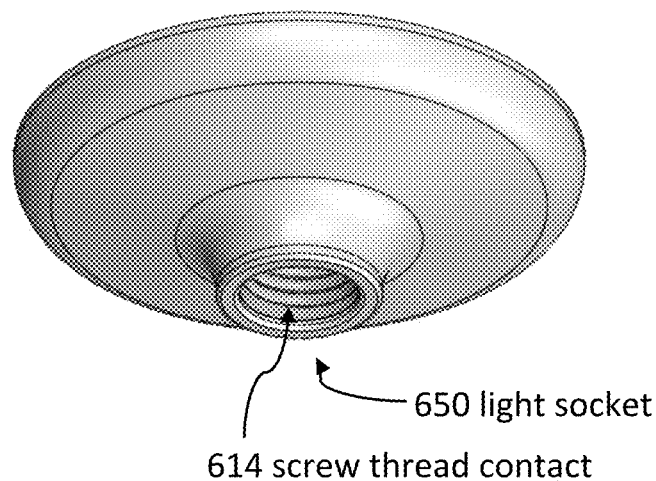
FIG. 4 illustrates a perspective view of a light socket, according to some embodiments.

FIG. 4 illustrates a perspective view of a light socket 650. The light socket 650 can include a screw thread contact 652 configured to mechanically and electrically couple with the screw thread contact 614 of the security system 202c (shown in FIG. 1a). The light socket 650 can also include a foot contact 654 configured to electrically couple with the foot contact 618 of the security system 202c (shown in FIG. 1a). The foot contact 654 of the light socket 650 can be located at the distal end of the light socket 650.

In some embodiments, the security system 202c can be described as having a proximal end and a distal end that is opposite the proximal end. The camera assembly 208 can be located at the distal end of the security system 202c. The security system 202c can include the foot electrical contact 618 located at the proximal end of the security system 202c. In order to energize the security system 202c, the security system 202c can be oriented such that the foot electrical contact 618 faces the foot contact 654 of the light socket 650. In this manner the distal end of the security system 202c faces away from the foot contact 654 of the light socket 650. As well, the camera assembly 608 can face away from the foot contact 654 of the light socket 650. Once the security system 202c is oriented in this manner, the security system 202c can be attached to the light socket 650.

Figure 6:
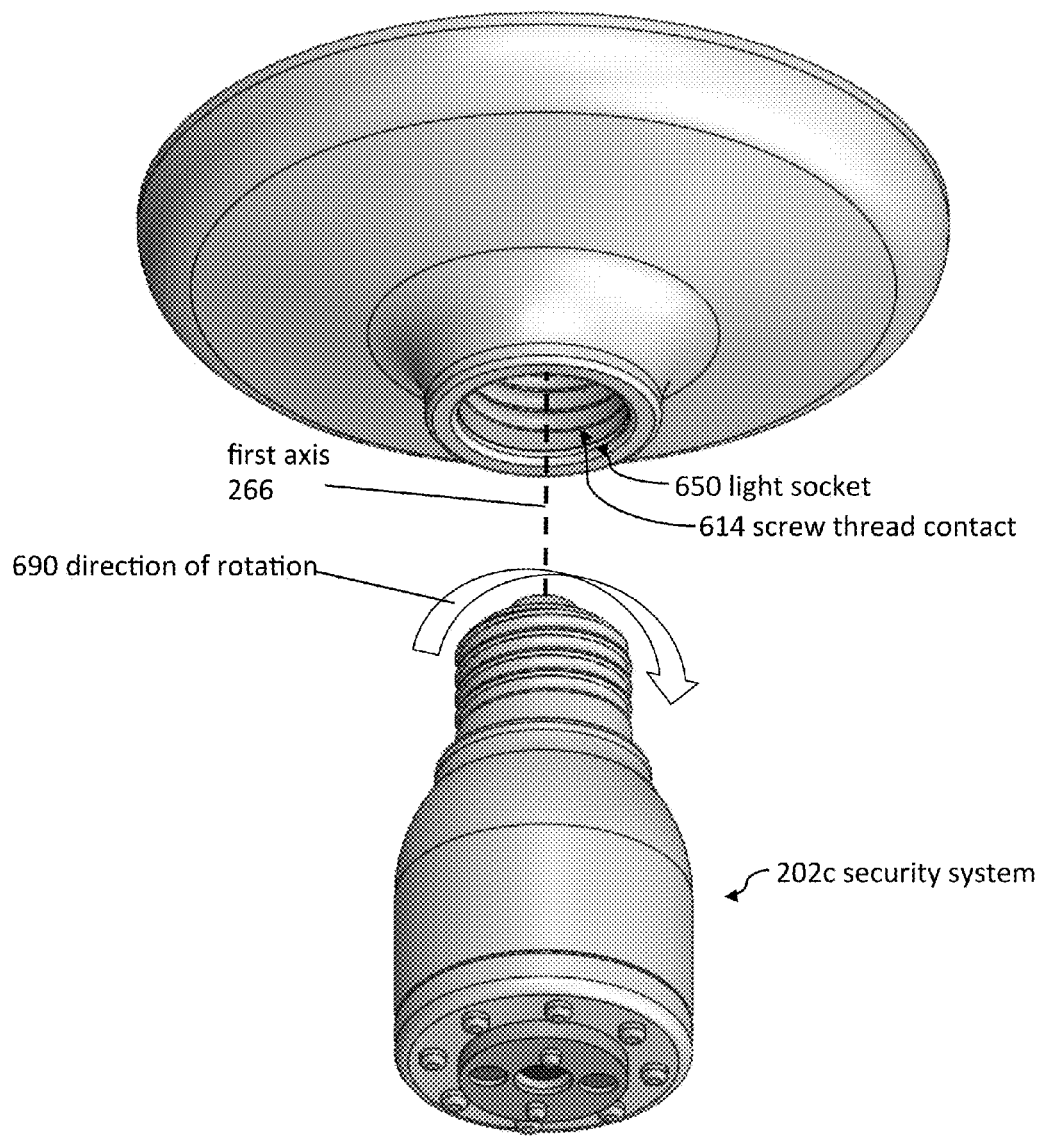
FIG. 6 illustrates a perspective view of a security system prior to the security system being mechanically and electrically coupled to the light socket, according to some embodiments.
Figure 7:
FIG. 7 illustrates the security system mechanically and electrically coupled to the light socket, according to some embodiments.

In some embodiments, the security system 202c is rotated as it is attached to the light socket 650. As shown in FIG. 6, the security system 202c can be rotated in a direction of rotation 690 about a first axis 266 to thereby attach the security system 202c to the light socket 650. As such, the foot contact 654 of the light socket 650 can be electrically coupled to the security system 202c. Furthermore, in many embodiments the foot contact 654 of the light socket 650 is electrically coupled to a light switch (not shown). In this manner, the foot contact 654 of the light socket 650, and the foot contact 618 of the security system 202c can be energized, when the light switch is activated (i.e. turned on).

Figure 5:
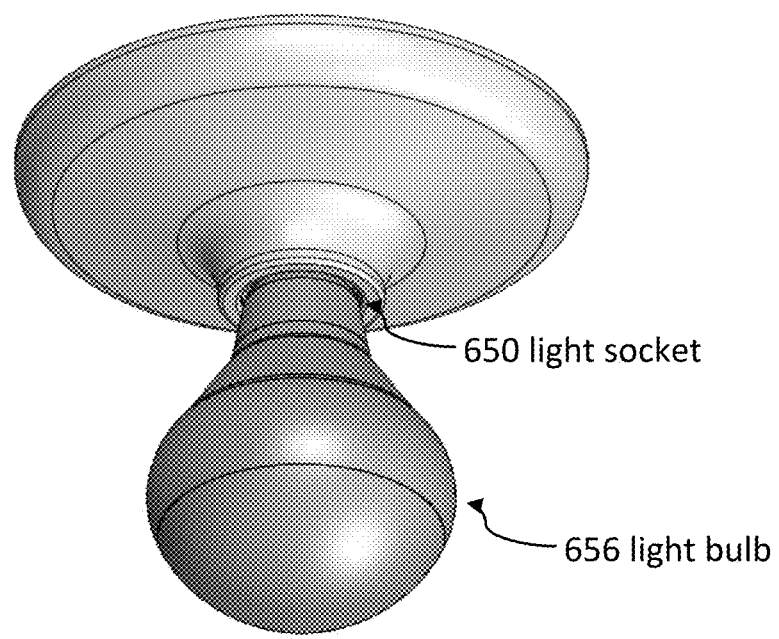
FIG. 5 illustrates a perspective view of a light bulb mechanically and electrically coupled to a light socket, according to some embodiments.

FIG. 5 illustrates a perspective view of a light bulb 656 mechanically and electrically coupled to the light socket 650. The light bulb 656 can be removed and replaced by a security system that comprises lights and a camera.

FIG. 6 illustrates a perspective view of the security system 202c just before the security system 202c is screwed into the light socket 650 to mechanically couple the security system 202c to a wall and/or to a building 300. Screwing the security system 202c into the light socket 650 also enables the security system 202c to receive electricity from the building 300 (shown in FIG. 3).

FIG. 7a illustrates the security system 202c screwed into the light socket 650. In this configuration, the security system 202c is electrically coupled to a power supply of the building 300. The light socket 650 can be located indoors or outdoors.

Figure 8:
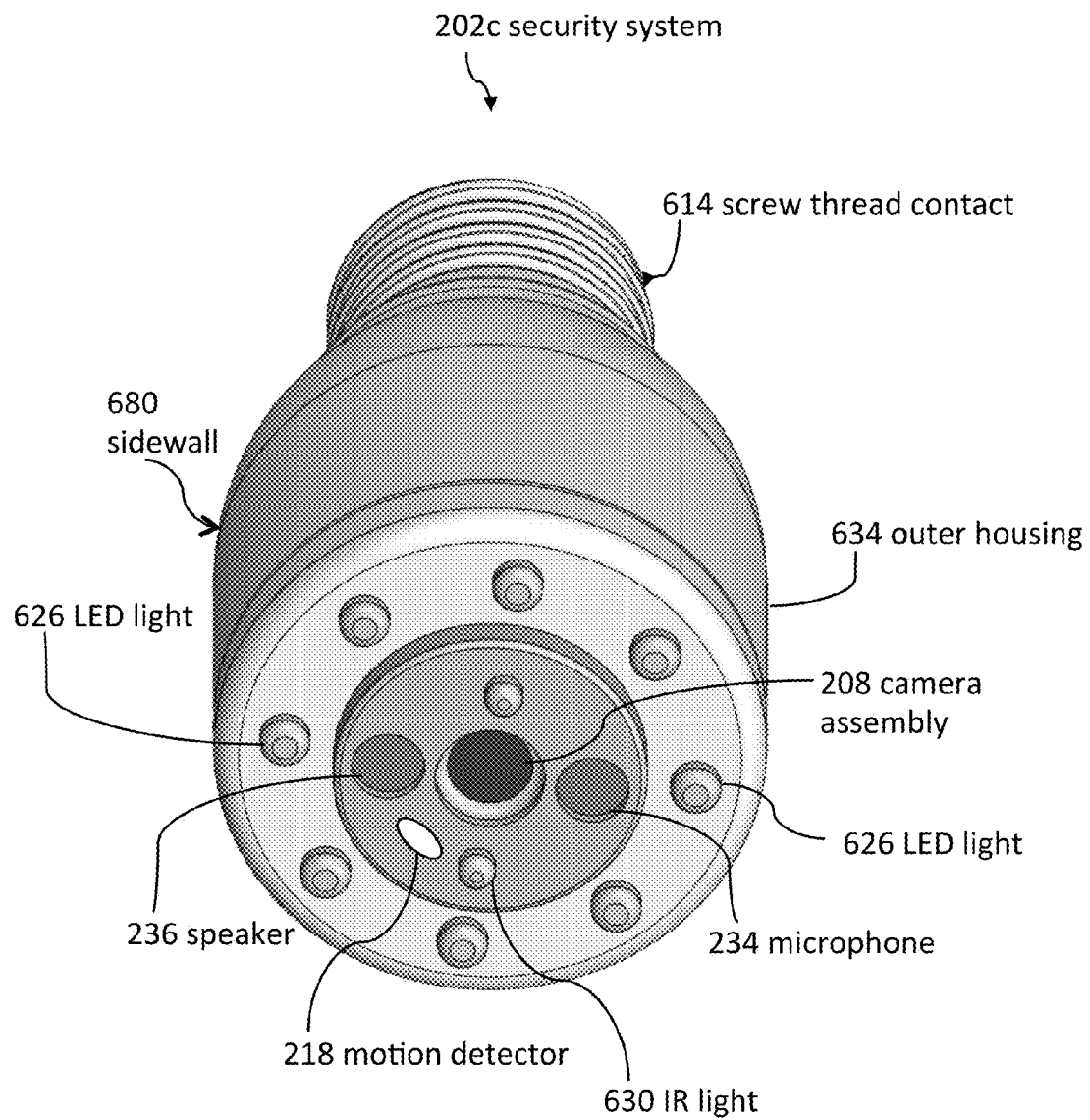
FIGS. 8 and 9 illustrate perspective views of security systems, according to some embodiments.

FIG. 8 illustrates a perspective view of the security system 202c. Not all of the lights 626, 630 are labeled to clarify other features. The camera assembly 208 can be aligned with a central axis 266 of the screw thread contact 614. The camera assembly 208 can include a fisheye lens. The camera assembly 208 can also include a cone-shaped mirror to enable viewing 360 degrees around the camera and/or around the outer housing 634. Software can be used to convert videos and/or pictures taken using the cone-shaped mirror into different formats (e.g., that are easier for users to interpret and/or include less distortion).

Figure 9:
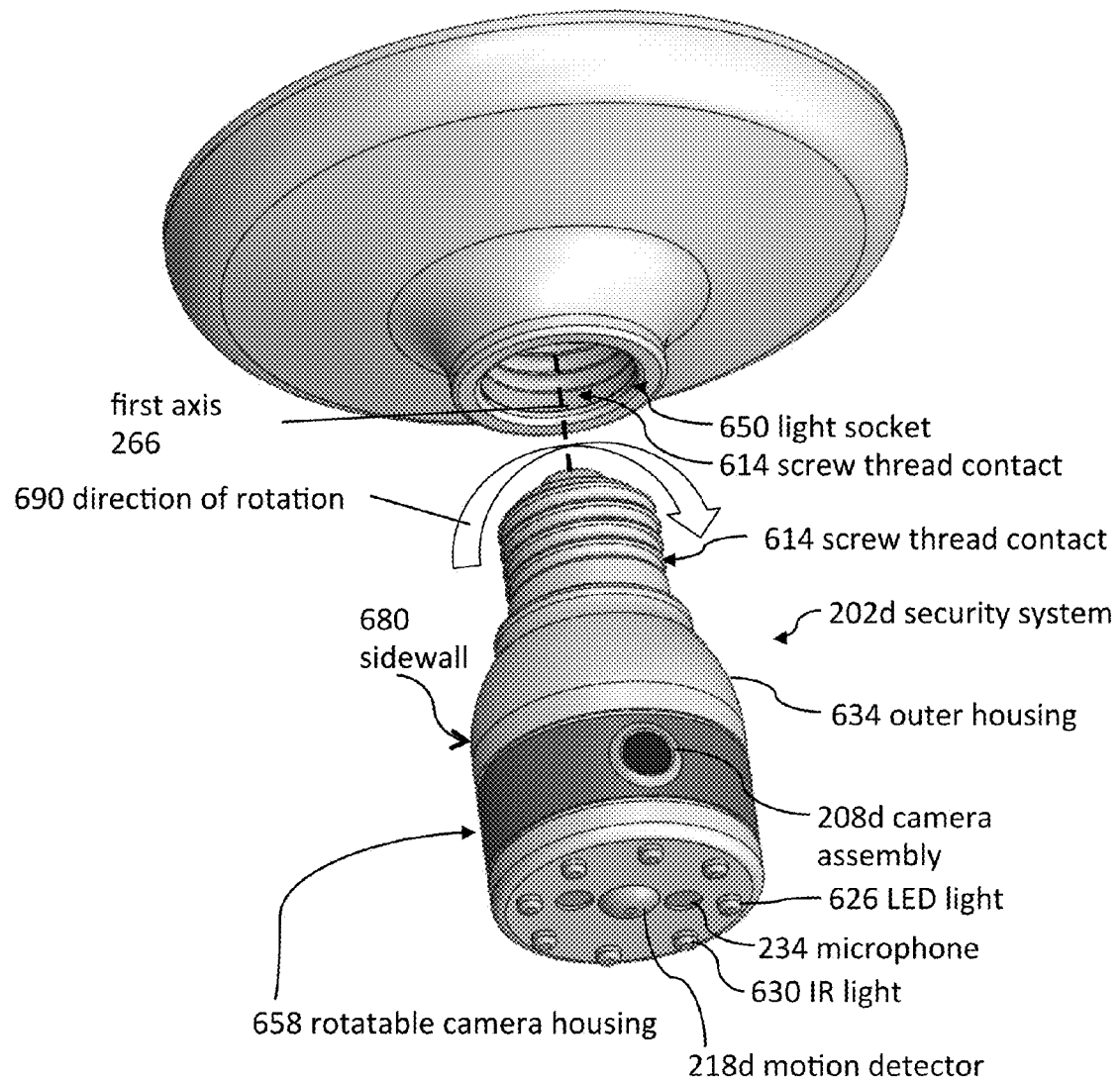
Figure 10:
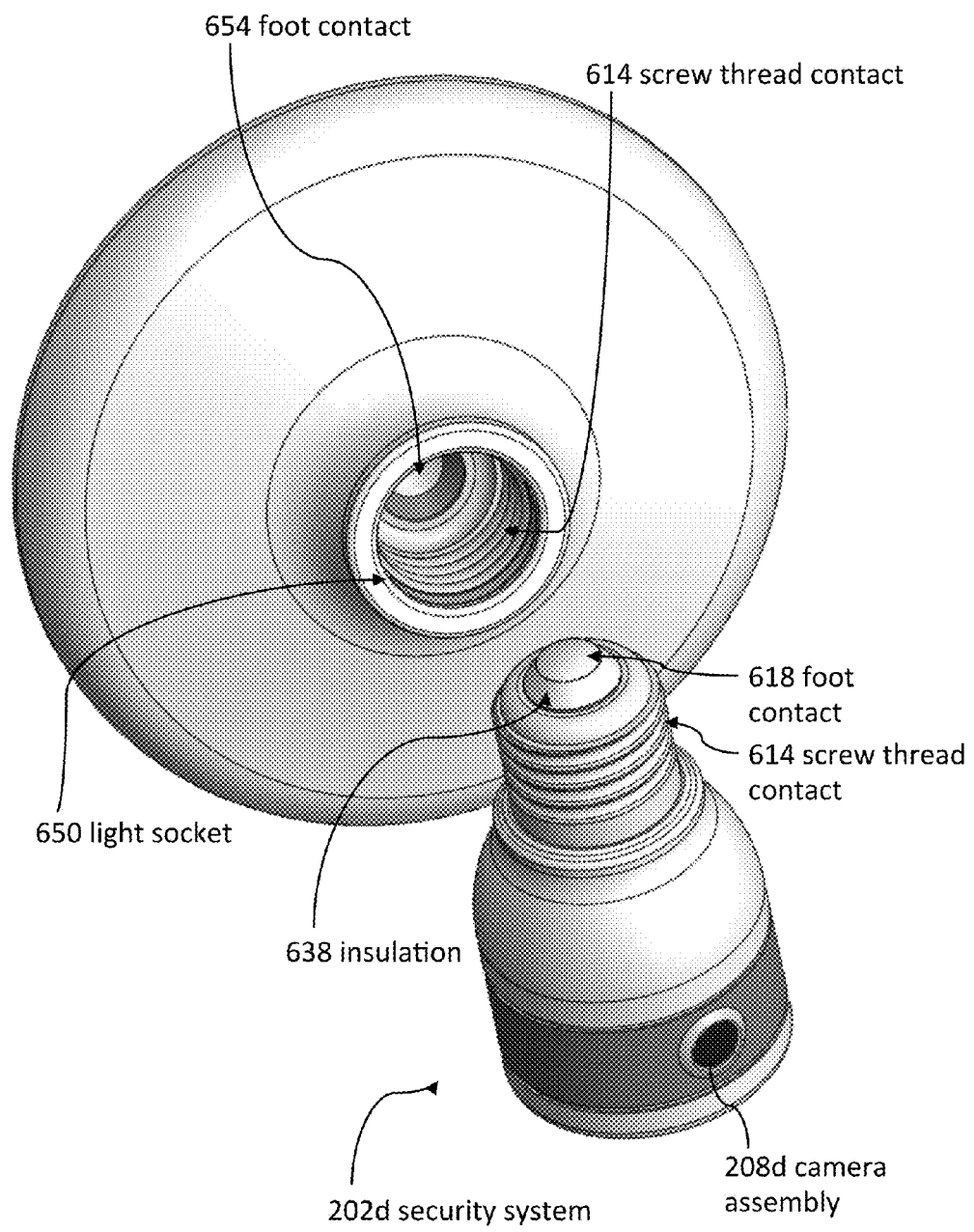
FIG. 10 illustrates a perspective view of electrical contacts, according to some embodiments.

FIGS. 9 and 10 illustrate a security system 202d that can include any of the features described in the context of the security system 202c shown in FIGS. 1a, 1b and 3-8. The security system 202d, as shown in FIG. 9, can also be configured to screw into the light socket 650. In this manner, the security system 202d can be rotated in a direction of rotation 690 about a first axis 266 to thereby attach the security system 202d to the light socket 650. The security system 202d can include a camera assembly 208d that faces a radial direction that is perpendicular to the first axis 266.

As shown in FIG. 9, the security system 202d can include a motion detector 218d configured to detect visitors (e.g., people moving outside of a building 300, people moving inside of a room). The motion detector 218d can be located at the distal end of the security system 202c such that the motion detector 218d faces away from the foot contact 618 of the security system 202c.

Furthermore, the security system 202d can include a rotatable camera housing 658. A camera assembly 208d can be coupled to the rotatable camera housing 658 such that the camera assembly 208d rotates around the perimeter of the outer housing 634 of the security system 202d as the camera housing 658 rotates around the perimeter of the outer housing 634. The camera housing 658 can rotate around a central axis 266 of the screw thread contact 614.

In some embodiments, the camera housing 658 can rotate in response to an event, such as a person entering a room, outdoor area, or space adjacent to the security system 202c. For example, the motion detector 218d can detect the person(s), such as the visitor(s), and in response to the motion detector 218d detecting the person(s), the security system 202c can cause the camera housing 658 to rotate to a position whereby the camera assembly 208 can record an image and/or video of the person(s).

The camera housing 658 can be rotated via any number of rotation methods. In some embodiments, the rotation of the camera housing 658 is caused by a command from a remote computing device, such as a smart phone, tablet, or other cellular device. For example, a user of the remote computing device can input a command into an app that is run on the remote computing device. The command can then be transmitted from the remote computing device to the security system 202c, to thereby rotate the camera housing 658.

Describing the camera housing 658 differently, the sidewall 680 of the security system 202c can comprise a first portion, such as an outer housing 634, and a second portion, such as a rotatable camera housing 658, which is distal to the first portion. The second portion, or rotatable camera housing 658, can be rotatable about the first axis 266. The camera housing 658 can be manually rotated by the user. For example, the user can grip the camera housing 658 with his or her hand and rotate the camera housing 658 to a desired position. As well, the camera housing 658 can be rotated by the security system 202c, such as, in response to an event. For example, when the security system 202c detects the visitor, via the motion detector 218d, the security system 202c can then determine whether the visitor is located within a field of vision of the camera 208. Accordingly, in response to determining that the visitor is not located within the field of vision of the camera 208, the security system 202c can rotate the second portion, or camera housing 658. Furthermore, the security system 202c can rotate the camera 208 about the first axis until 266 the visitor is within a field of vision of the camera 208.

Additionally, the security system 202c may be configured to receive an instruction from a remote computing device 204. The instruction may include a command to rotate the second portion, or camera housing 658, to any location as determined by the user of the remote computing device 204. Accordingly, in response to receiving the instruction from the remote computing device 204, the security system 202c may be configured to rotate the second portion such that the camera 208 rotates about the first axis 266. As such, the user of the remote computing device 204 may be able to remotely rotate the camera housing 658 to thereby change the field of vision of the camera 208.

The security system 202d can use a microphone 234 to listen for visitors. When the security system 202d detects visitors (e.g., via motion or sound), the security system 202d can turn on LED lights 626, record sounds from the visitors, and/or take videos of the visitors. In some embodiments, the security system 202d records when visitors move by the security system 202d.

FIG. 10 illustrates a perspective view of electrical contacts. Connecting the security system 202d to the light socket 650 can enable the security system 202d to be electrically connected to a power supply.

Figure 11:
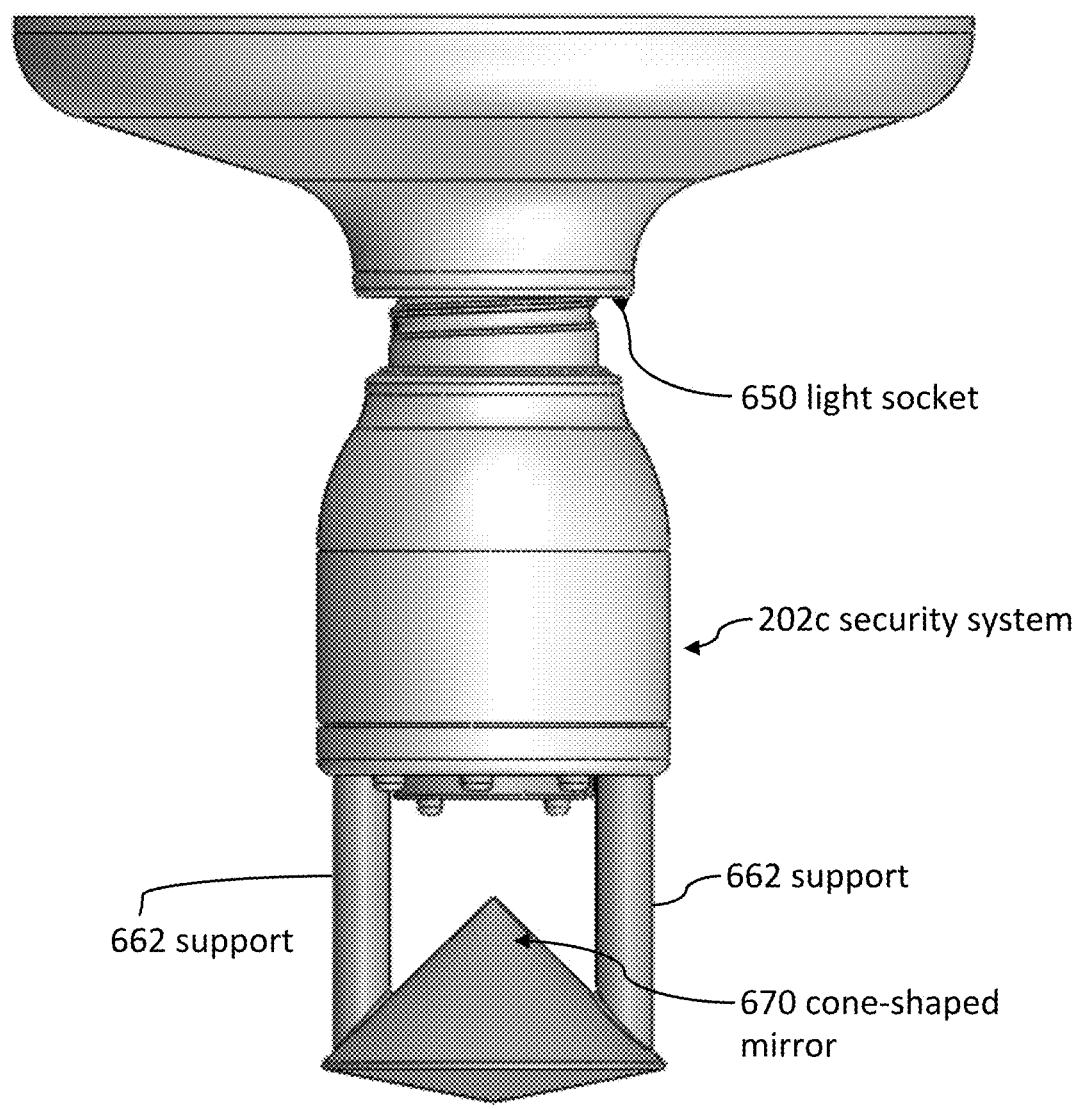
FIG. 11 illustrates a side view of a security system with a cone-shaped mirror, according to some embodiments.

FIG. 11 illustrates a side view of a security system 202c with a cone-shaped mirror 670. Supports 662 can extend from an end of the security system 202c that is opposite an end that includes the screw thread contacts 614 (labeled in FIG. 12).

Figure 12:
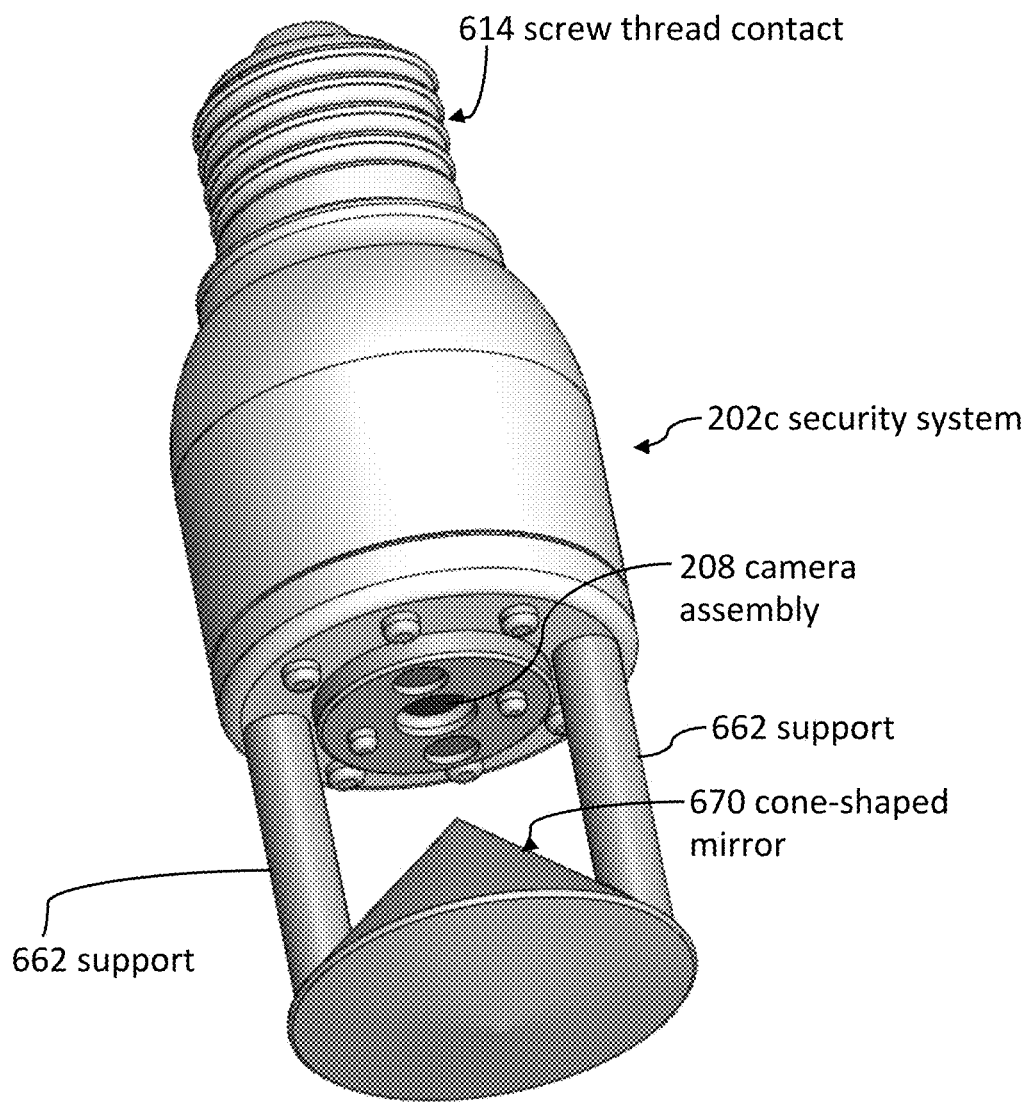
FIG. 12 illustrates a perspective view of the security system with a cone-shaped mirror, according to some embodiments.

FIG. 12 illustrates a perspective view of the security system with a cone-shaped mirror 670. The camera assembly 208 can include a camera that is oriented towards the cone-shaped mirror to enable the security system 202c to record visitors in many directions around the security system 202c. Software can be used by the security system 202c, the remote computing device 204, and/or the server 206 to reduce and/or eliminate distortion in pictures taken using the security system 202c.

Figure 13A:
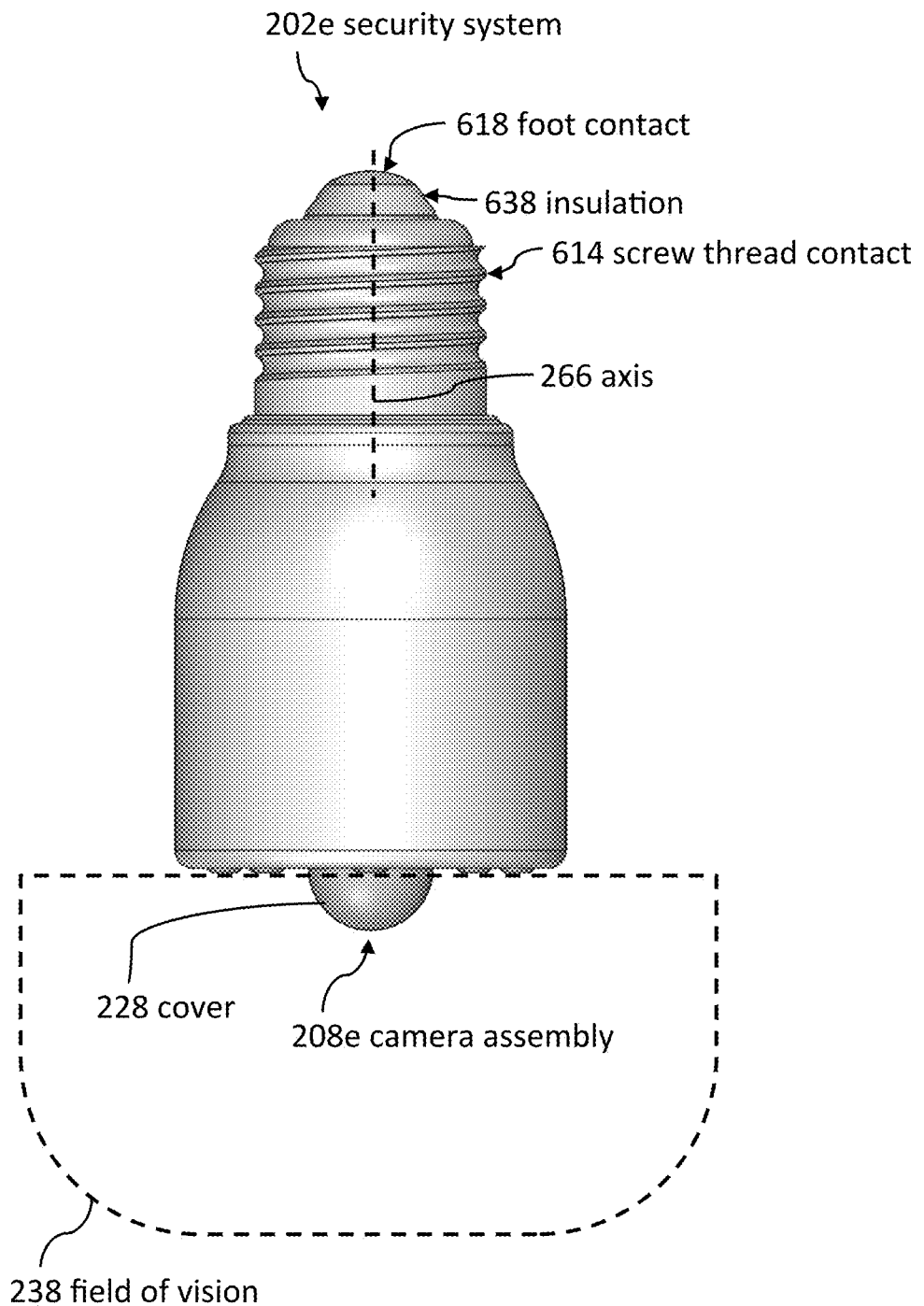
FIGS. 13a, 13b, 13c, and 13d illustrate side views of security systems with respective dome camera assembly, according to various embodiments.
Figure 13B:
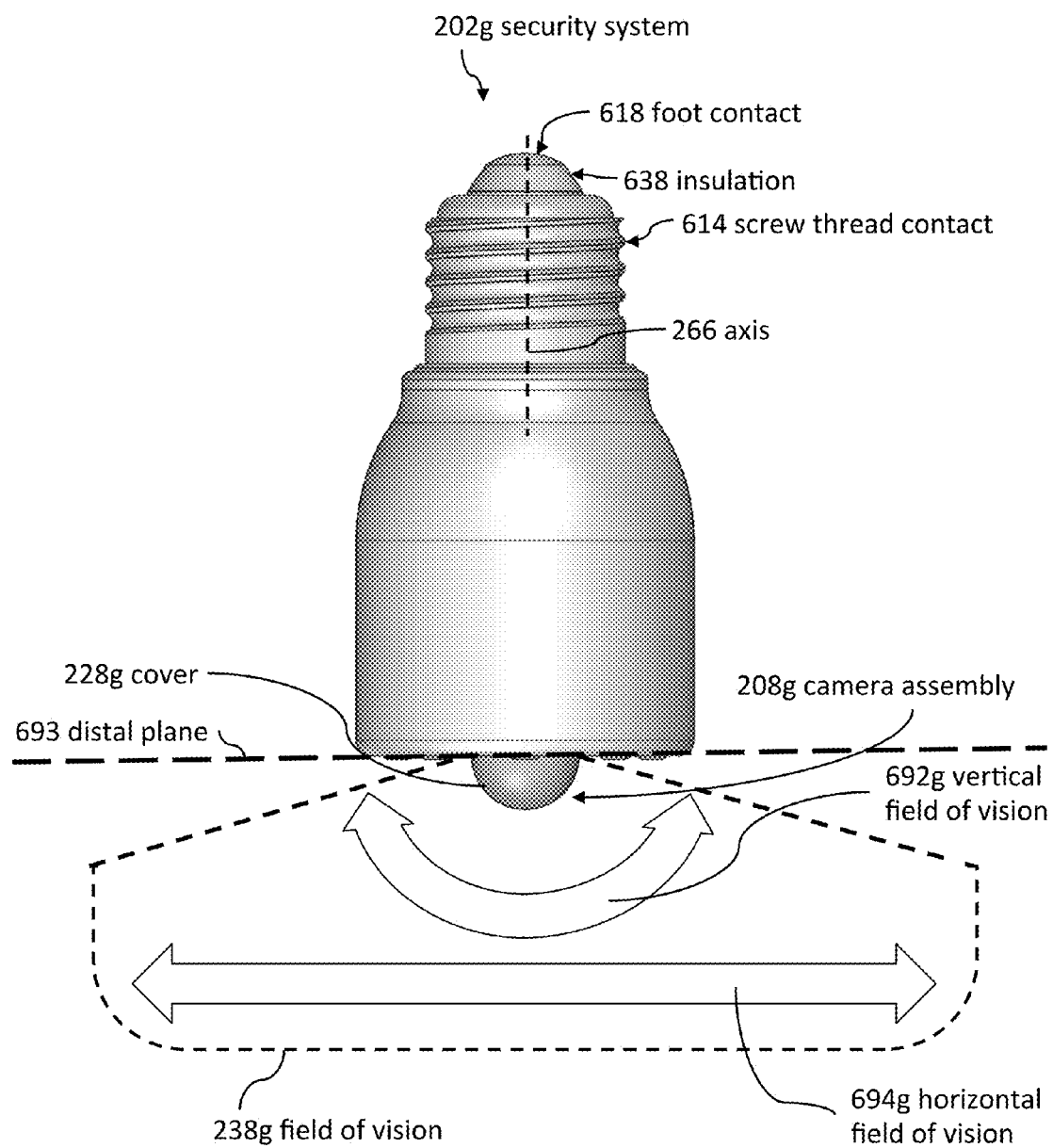

FIG. 13a illustrates a side view of a security system 202e with a dome camera assembly 208e. The dome camera assembly 208e can have a shape that is half of a sphere. In some embodiments, the dome camera assembly 208e includes an outer cover 228 that has a curved and/or spherical shape (e.g., half of a sphere). The cover 228 can be a translucent material such as plastic and/or polycarbonate.

Figure 13C:
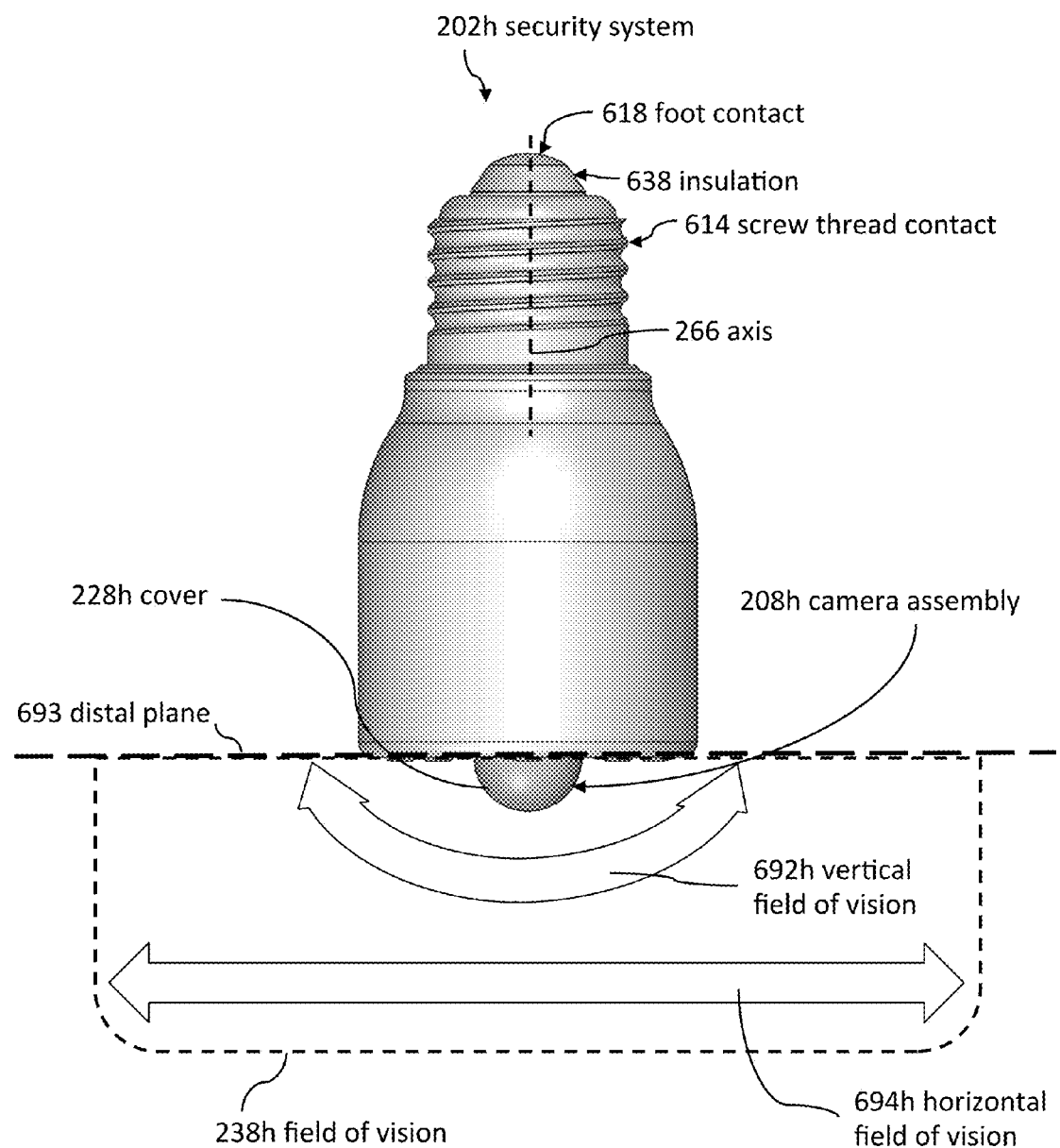

The field of vision 238 of the dome camera assembly 208e can include half of a sphere. In some embodiments, the field of vision 238 includes approximately 360 degrees around the base of the cover 228 and/or around a central axis 266 of the screw thread contacts 614. In several embodiments, the field of vision 238 includes at least 330 degrees around the base of the cover 228. In some embodiments, the field of vision 238 is approximately 180 degrees in a plane that includes the central axis 266 of the screw thread contacts 614 (e.g., in the plane represented by the page on which FIG. 13a appears). In several embodiments, the field of vision 238 is at least 140 degrees and/or less than 260 degrees in a plane that includes the central axis 266. FIGS. 13b-13e further illustrate the field of vision in various embodiments. With specific reference to FIG. 13b, the field of vision 238g can be defined by a vertical field of vision 692g and a horizontal field of vision 694g. The vertical field of vision 692g can be any angle less than 180 degrees (as shown by the distal plane 693), such as 140 degrees. Because FIGS. 13b-13e are side views, the horizontal field of vision 692g and the vertical field of vision 694g are actually radial, meaning that they extend 360 degrees around the perimeter of the camera assembly 208g. This 360 degree periphery is further illustrated in FIG. 13e. FIG. 13e is a top down view, looking from above the security system (when it is mounted to the light socket 650) to the ground below the security system. FIG. 13e shows that the horizontal field of vision 694, 694g actually covers 360 degrees around the perimeter of the security system and the axis 266. While the vertical field of vision is not illustrated in FIG. 13e, the vertical field of vision is also radial, in that it covers the 360 degree area around the security system.

The security system 202h illustrated in FIG. 13c may define a 180 degree vertical field of vision, which means that the camera assembly 208h is able to see anything that is level with or below the distal plane 693.

Figure 13D:
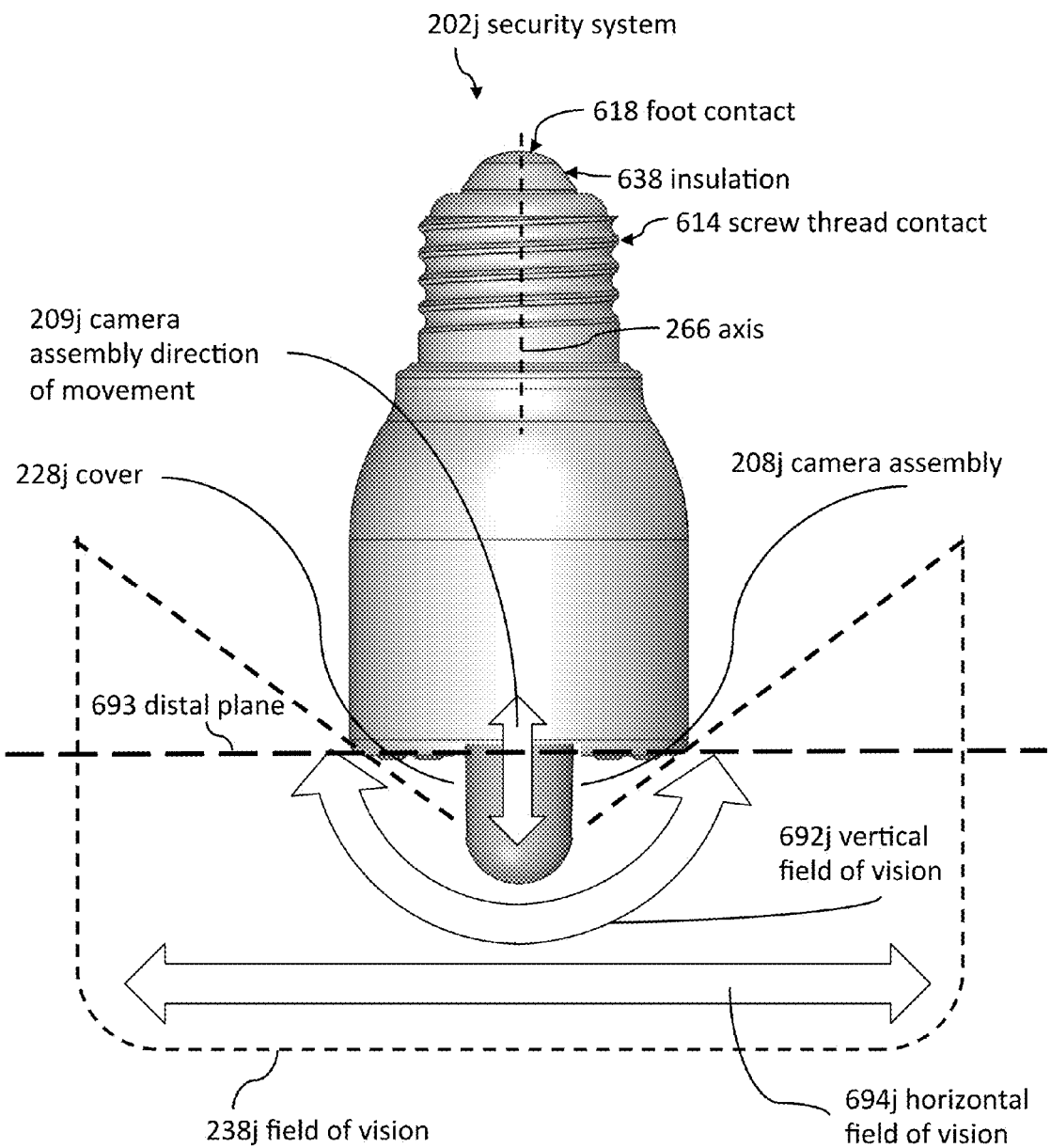
Figure 13E:
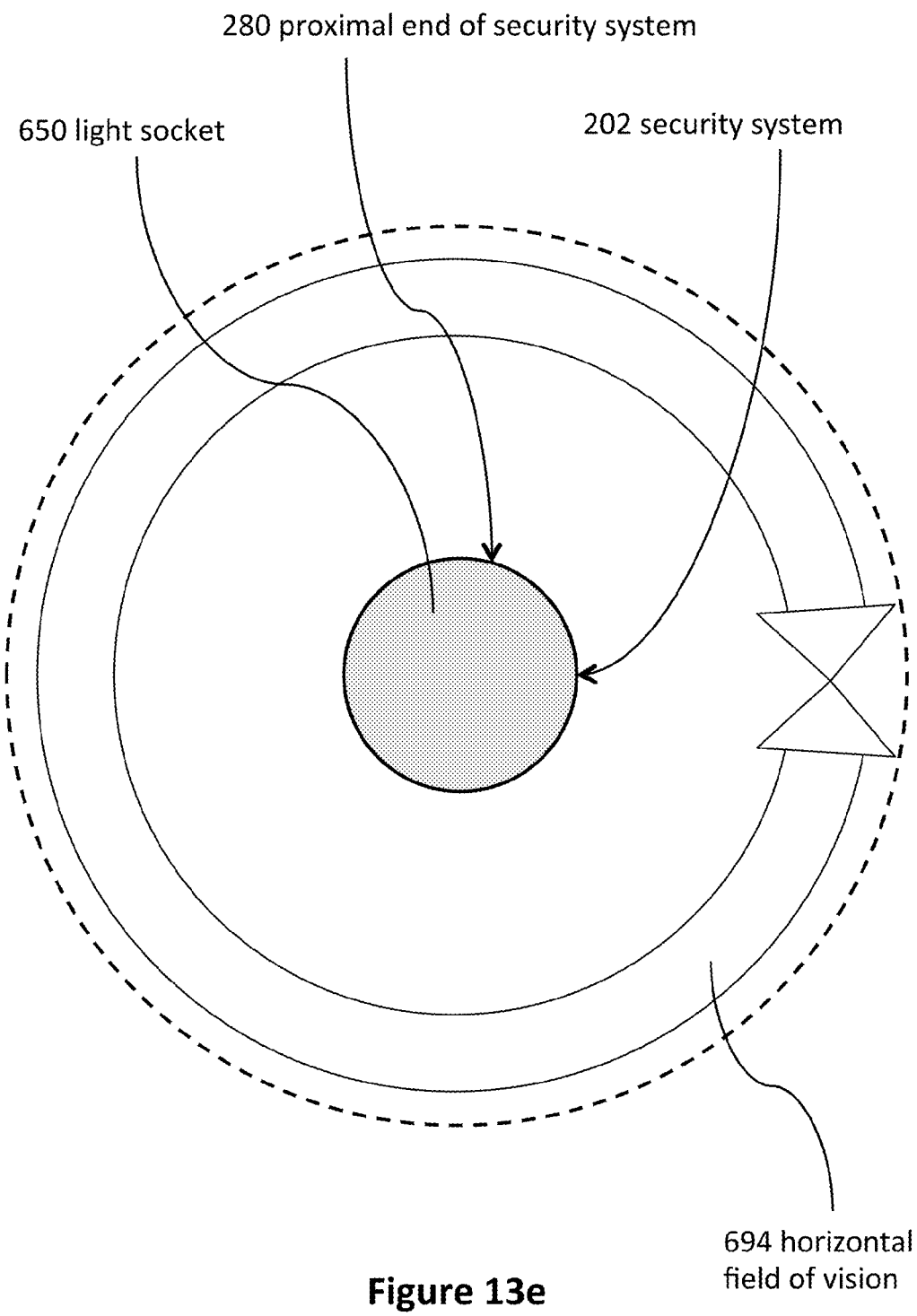
FIG. 13e illustrates a top-down view of a security system with a horizontal field of vision, according to some embodiments.

Furthermore, as shown in FIG. 13d, the security system 202j may be configured to achieve a vertical field of vision 692j that is greater than 180 degrees. For example, some embodiments may have a vertical field of vision equal to at least 250 degrees, up to 250 degrees, up to 280 degrees, and in some embodiments, up to 300 degrees. (It should be appreciated that in some embodiments that utilize multiple cameras, a vertical field of vision of up to 360 degrees may be achieved.) In the embodiment shown in FIG. 13d, to accomplish a vertical field of vision greater than 180 degrees, the camera assembly 208j may be configured to move vertically downward. Specifically, the camera assembly 208j may be configured to move along a camera assembly direction of movement 209j, as shown in FIG. 13d. In this regard, the camera assembly 208j may thereby gain separation from the distal end of the security system 202j. This may allow the camera assembly 208j to achieve a greater line of sight past the sidewalls in the upward, or proximal, direction.

It should be appreciated that various methods may be used to retain the camera assembly 208h at various locations along the camera assembly direction of movement 209h. In some embodiments, the camera assembly 208h may be configured to engage mechanical latches to secure the camera assembly 208h at discrete locations along the direction of movement 209h. In some embodiments, the camera assembly 208h may be configured to be retained at any location along the direction of movement 209h via friction. In some embodiments, the camera assembly 208h may be threadably engaged and disengaged at various locations along the direction of movement 209h. As well, once the camera assembly 208h has been moved to its desired vertical position, the camera assembly 208h is still thereby mechanically and electrically coupled to the security system.

As well, it should be appreciated that the camera assembly 208h may be vertically moved along the direction of movement 209h in response to any command or manual movement. For example, the camera assembly 208h may be moved in response to a command from a remote computing device 204. As well, the camera assembly 208h may be moved along the direction of movement 209h in response to detecting a visitor. For example, the camera assembly 208h may be positioned in a retracted position, whereby the camera assembly 208h is located substantially within the security system as shown in FIGS. 13c and 13d. Accordingly, in response to the motion detector 218 detecting a visitor, the camera assembly 208h may then move to an extended position (as shown in FIG. 13d) to capture a greater vertical field of vision than in the retracted position. Moreover, the camera assembly 208h may be manually moved by a user.

Figure 14:
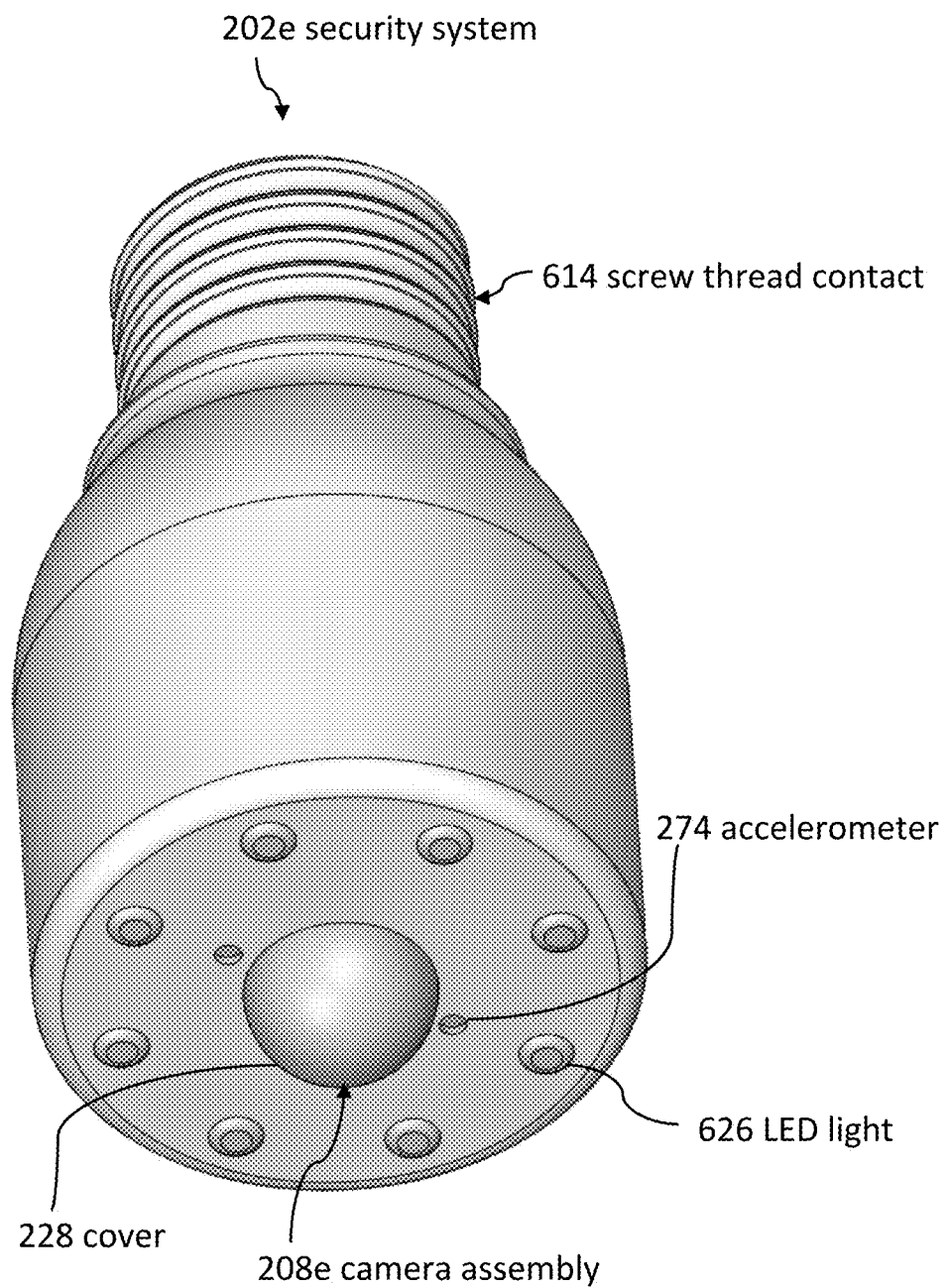
FIG. 14 illustrates a perspective view of a security system, according to some embodiments.

FIG. 14 illustrates a perspective view of the security system 202e from FIG. 13a. The dome camera assembly 208e can be used with any of the security systems described herein. The security system 202e can include lights (e.g., LEDs) on an end that is opposite the end that includes the screw thread contacts 614.

Any of the security systems described herein can use the methods and systems described in U.S. Nonprovisional patent application Ser. No. 14/463,548; filed Aug. 19, 2014; and entitled DOORBELL COMMUNICATION SYSTEMS AND METHODS; the entire contents of which are incorporated herein by reference. For example, the grid sensor methods can be used with security systems 202c, 202d, and 202e. The security system embodiments described in U.S. Nonprovisional patent application Ser. No. 14/463,548 can be replaced with security systems 202c, 202d, and 202e. Security systems 202c, 202d, and 202e can be used in the context of the security systems described in any of the patent applications incorporated by reference.

Viewing Perspective

Many of the camera assemblies described herein can be mounted in diverse orientations. The mounting orientations might not be ideal viewing orientations. Embodiments can include changing the viewing orientations (e.g., viewing angles) via software (e.g., an "app") and/or via a user interface 240 on a display screen 242 of a computing device 204 (see FIG. 2).

Cameras can be mounted in a lamp, jutting out of a wall (e.g., horizontally), and upside down (e.g., hanging down from a ceiling). The software and/or user interface 240 can enable users to select a button to adjust the viewing orientation a certain amount (e.g., 90 degrees).

Figure 15:
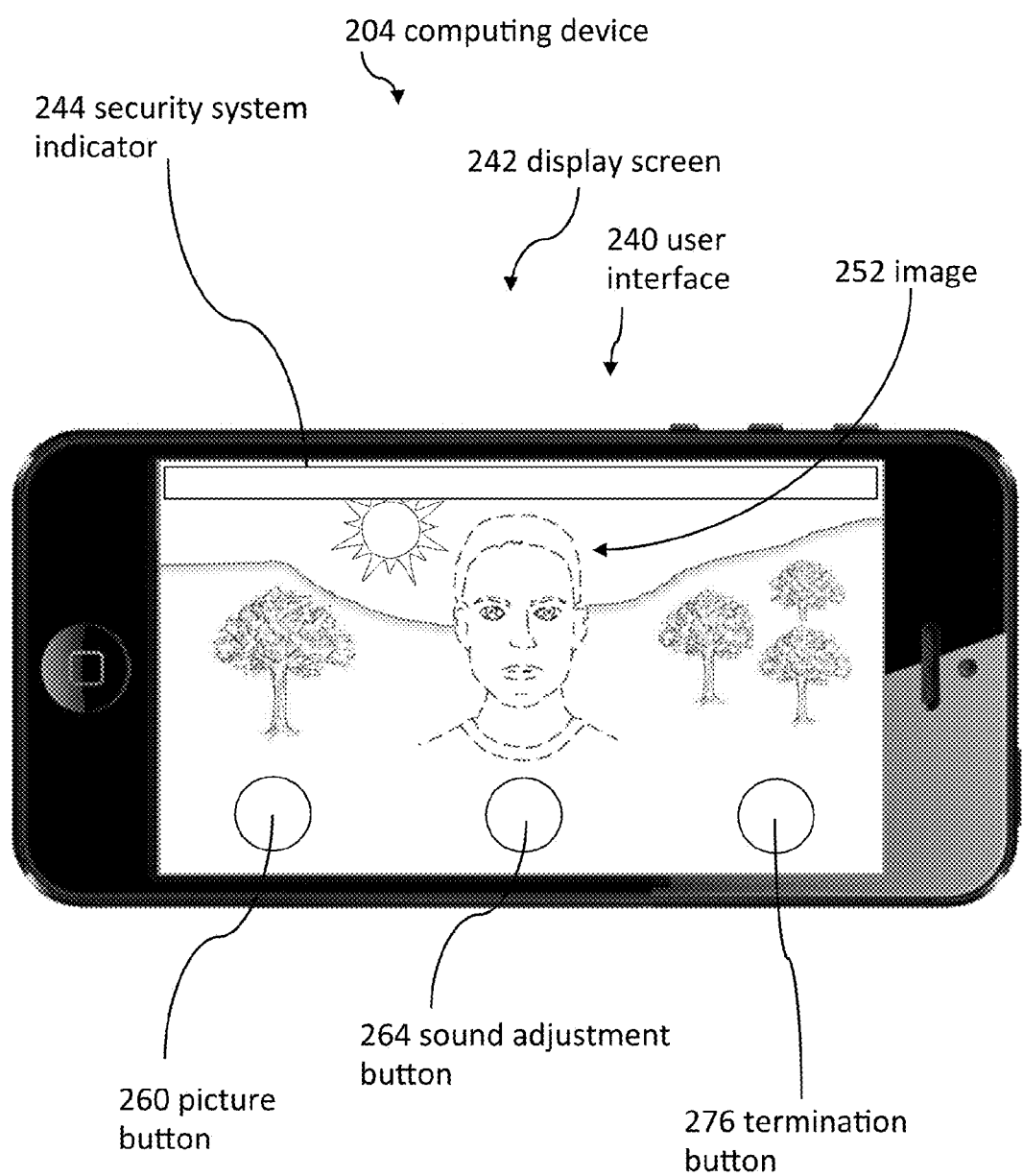
FIGS. 15 and 16 illustrate a user interface with an adjustable viewing orientation, according to some embodiments.
Figure 16:
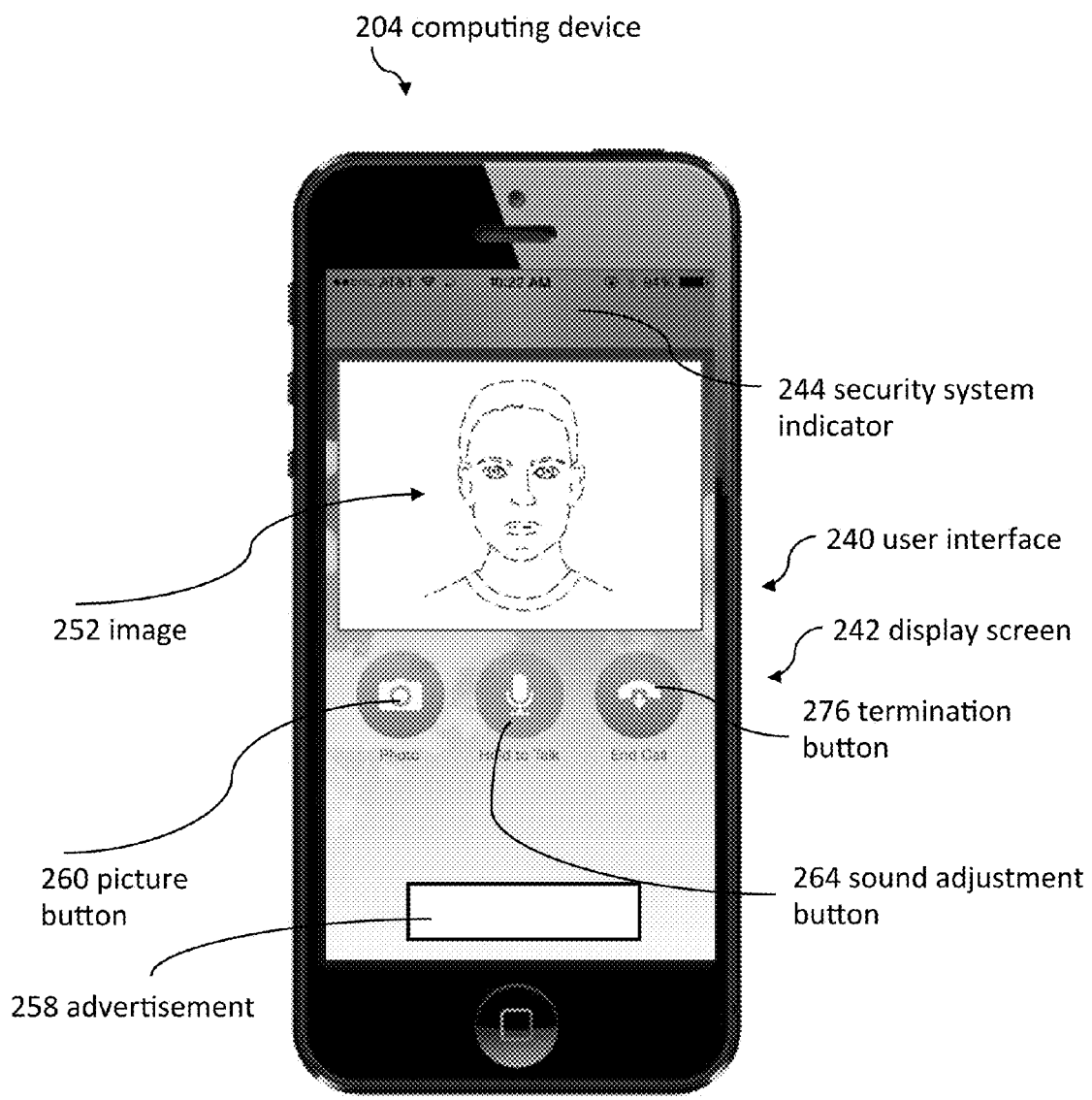

FIG. 15 illustrates a user interface 240. The image 252 in FIG. 15 is oriented as a landscape, which can span entire viewing portion of the display screen 242 of the remote computing device 204. The user can adjust the viewing orientation by selecting an orientation button (not shown), or simply by rotating the remote computing device 204 to the position of the desired orientation (e.g. if you want to view portrait, just the remote computing device rotate by ninety degrees as shown in FIG. 16). Accordingly, in some embodiments, selecting the orientation button shifts the image 252 ninety degrees. FIG. 16 illustrates the new orientation of the image 252 after selecting the orientation button, or rotating the remote computing device 204 to the desired orientation.

In some embodiments, the security system automatically detects the orientation in which the camera is inserted into a light socket. The security system can then automatically adjust the viewing orientation in response to the detected orientation (e.g., so the image 252 appears right-side up). The security system can detect the inserted orientation via an accelerometer 274.

Visitor Identification Embodiments

Many embodiments may utilize the visitor identification abilities of the person using the remote computing device 204 (shown in FIG. 1a). Various technologies, however, can be used to help the user of the remote computing device 204 to identify the visitor. Some embodiments use automated visitor identification that does not rely on the user, some embodiments use various technologies to help the user identify the visitor, and some embodiments display images and information (e.g., a guest name) to the user, but otherwise do not help the user identify the visitor.

Referring now to FIG. 1a, the camera assembly 208 can be configured to visually identify visitors through machine vision and/or image recognition. For example, the camera assembly 208 can take an image of the visitor. Software run by any portion of the system can then compare select facial features from the image to a facial database. In some embodiments, the select facial features include dimensions based on facial landmarks. For example, the distance between a visitor's eyes; the triangular shape between the eyes and nose; and the width of the mouth can be used to characterize a visitor and then to compare the visitor's characterization to a database of characterization information to match the visitor's characterization to an identity (e.g., an individual's name, authorization status, and classification). Some embodiments use three-dimensional visitor identification methods.

Some embodiments include facial recognition such that the camera assembly 208 waits until the camera assembly 208 has a good view of the person located near the security system 202c and then captures an image of the person's face.

Several embodiments can establish a visitor's identity by detecting a signal from a device associated with the visitor (e.g., detecting the visitor's smartphone). Examples of such a signal include Bluetooth, WiFi, RFID, NFC, and/or cellular telephone transmissions.

Furthermore, many embodiments can identify an identity of a visitor and determine whether the visitor is authorized to be located in a predetermined location. For example, the light socket 650 may be located in a room inside a building 300. The security system 202c can determine whether the visitor is authorized to be located in the room. In response to determining that the visitor is not authorized to be located in the room, the security system 202c can transmit an alert to the remote computing device 204 to notify a user of the remote computing device 204 that the visitor is not authorized to be located in the room.

In some embodiments, the security system 202c may be located outside of a building 300, for example, near a swimming pool. Accordingly, the security system 202c may be used to determine the identity of the visitor and thereby determine whether the visitor is authorized to be located near the swimming pool. This may allow the user to monitor the swimming pool to determine if small children and/or any other unauthorized people approach the swimming pool. In effect, the security system 202c can be used as a safety monitor.

Furthermore, the security system 202c can also sound an audible message to warn the visitor that he or she is not authorized to be located in the room or outdoor area (e.g. swimming pool). For example, in response to determining that the visitor is not authorized to be located in the room or outdoor area, the security system 202c may broadcast a predetermined audible message, via the speaker 236 in the security system 202c, to notify the visitor that the visitor is not authorized to be located in the room or outdoor area. The security system 202c may also be configured to allow the user of the remote computing device 204 to speak to the visitor that is not authorized to be located in the room or outdoor area. For example, if the user's child has approached the swimming pool, the user may speak a message into the remote computing device 204, which may then be transmitted to the security system 202c and sounded via the speaker in the security system 202c (e.g. "Mitch, you are not allowed to be in the swimming pool after dark.").

Embodiments of the security system 202c, may also save a history of times when the visitor was detected in the room or outdoor area by the security system 202c. It should be appreciated that this may also be used for a variety of purposes. For example, the user may have a dog walker walk the user's dog when the user is gone at work. In this manner, the security system 202c may be configured to save a history of times when the dog walker arrives at the building 300, which may allow the user may be able to oversee and determine if the dog walker is walking the user's dog as promised. This may be helpful when the user pays the dog walker's invoice. The user can review the history to determine whether the dog walker's visits to the buildings match the invoiced dates. The person of ordinary skill in the art will recognize a variety of situations to utilize this technology.

As well, the security system 202c may take action in response to determining that the visitor is authorized to be located in the room. For example, the security system 202c may transmit a second alert to the remote computing device 204, wherein the second alert notifies the user of the remote computing device 204 that the visitor is located in the room. In some embodiments, the second alert may also notify the user of the remote computing device 204 that the visitor is authorized to be located in the room.

In order to determine the identity of the visitor, the security system may utilize any technology capable of identifying a person or a remote computing device, such as facial recognition of a visitor, near field communication of a remote computing device 204 (e.g. identifying a remote computing device 204 associated with the visitor via Bluetooth), and the like.

Methods of Detecting Visitors

Figure 17:
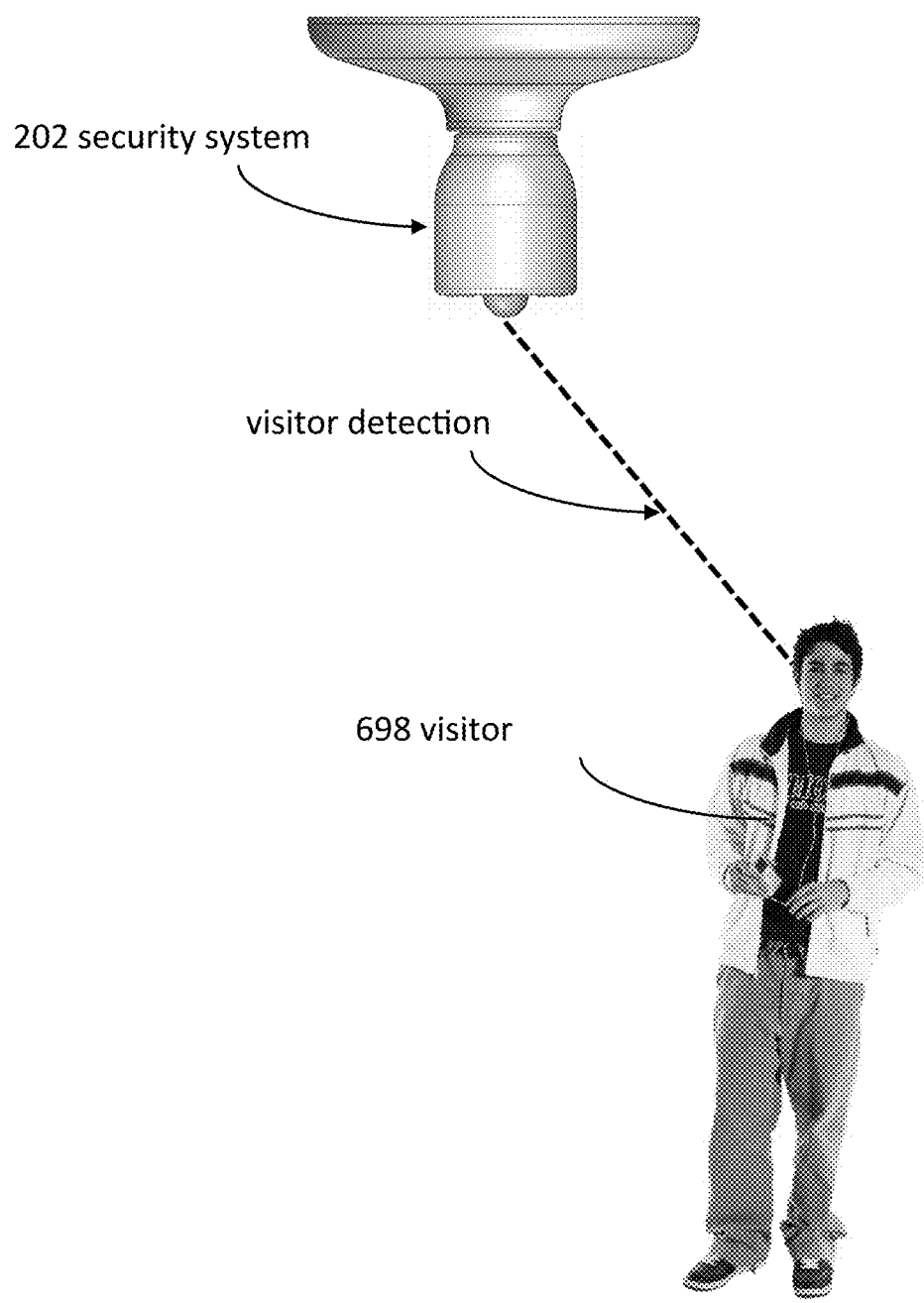
FIG. 17 illustrates a security system detecting a visitor, according to some embodiments.
Figure 18:
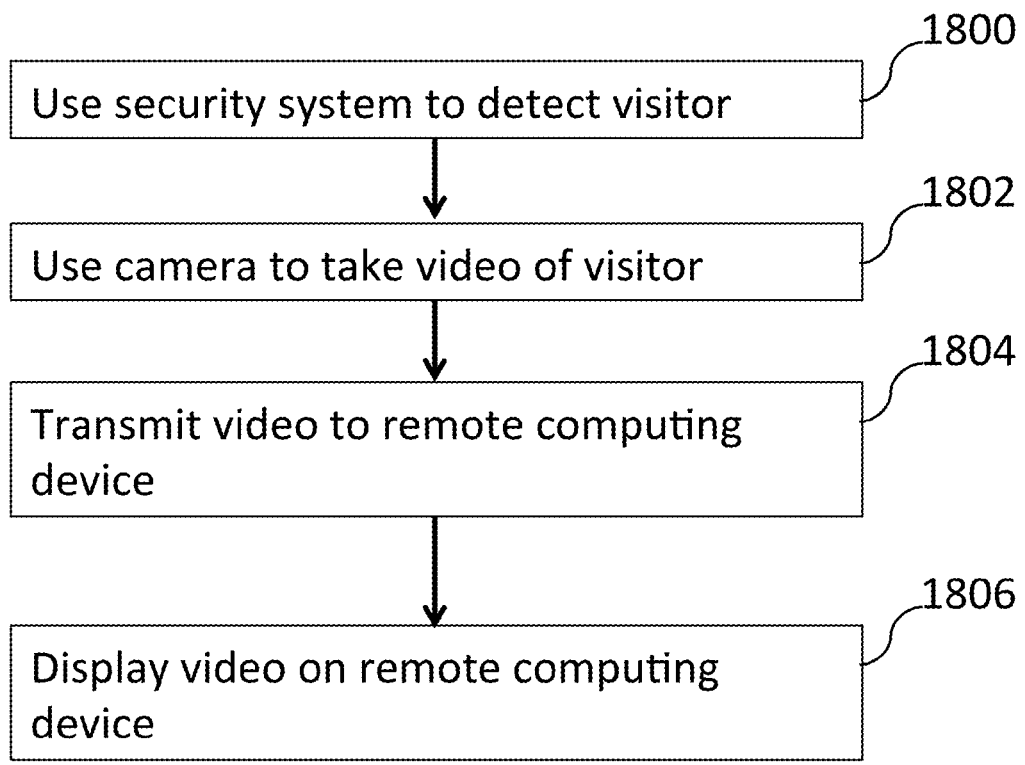
FIGS. 18-27 illustrate flow-charts of various methods of using a security system, according to various embodiments.

It should be appreciated that this disclosure includes a variety of methods of using the security system to detect visitors, like the visitor 1700 shown in FIG. 17. For example, as illustrated in FIG. 18, some methods include using the security system 202 to detect a visitor (at step 1800), and using the camera to take video of the visitor (at step 1802). As well, some embodiments include transmitting the video to a remote computing device 204 (at step 1804) and displaying the video on the remote computing device 204 (at step 1806). This may effectively allow a remote user to monitor the activity around the security system 202.

Figure 19:
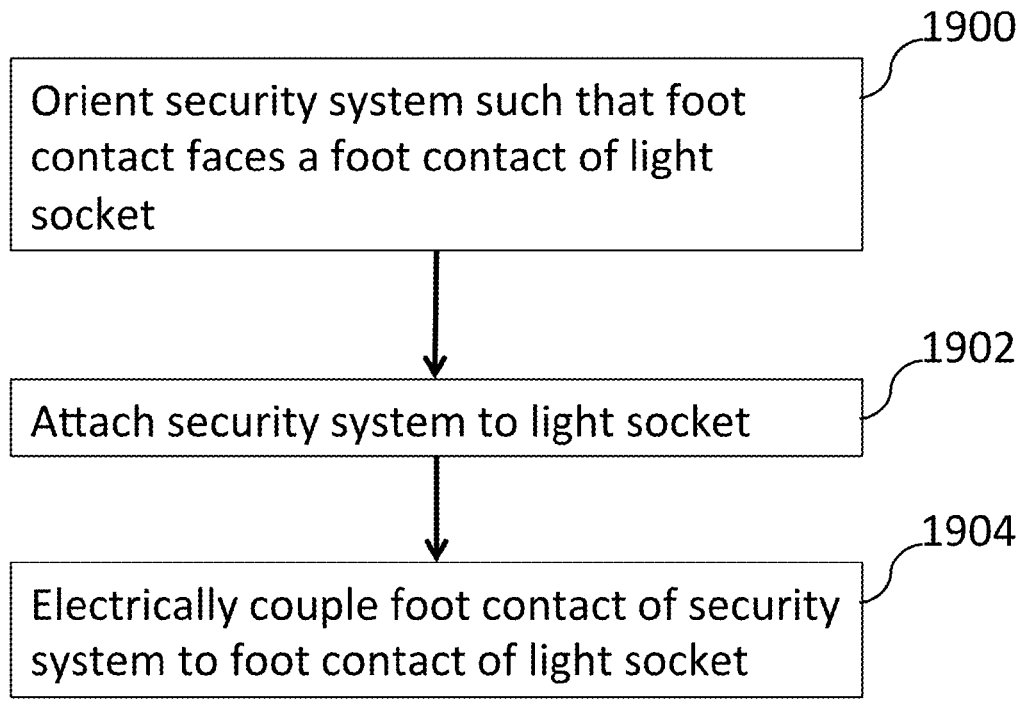

As shown in FIG. 19, some methods may include orienting the security system 202 such that the foot contact 618 of the security system 202 faces a foot contact 654 of the light socket 650 (at step 1900). FIG. 19 further illustrates a method that may include attaching the security system 202 to the light socket 650 (at step 1902) and electrically coupling foot contact 618 of the security system 202 to the foot contact 654 of the light socket 650. This electrical coupling may thereby energize the security system 202 to power all of the onboard components.

Figure 20:
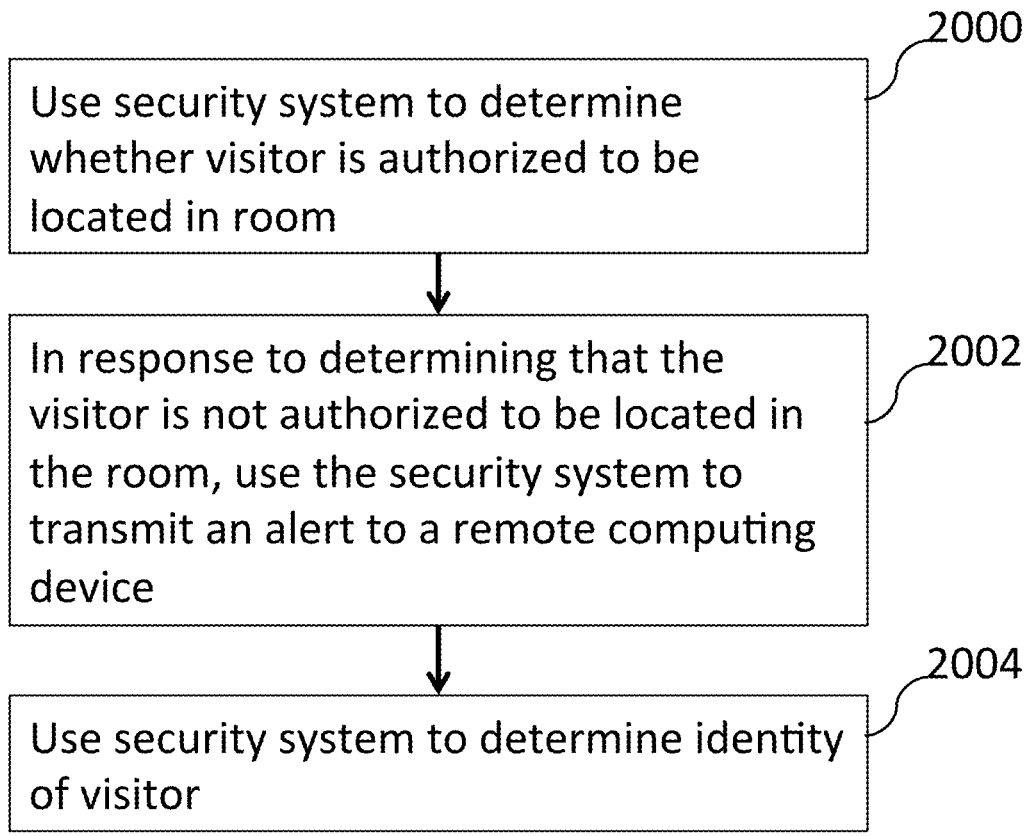

FIG. 20 shows a method that includes using the security system 202 to determine whether the visitor is authorized to be located in a room or in a space that the security system 202 is monitoring (at step 2000). In response to determining that the visitor is not authorized to be located in the room or the space, the method may further include using the security system 202 to transmit an alert to a remote computing device 204 (at step 2002). The alert may be a warning message, such as a text message or email, which warns the user that the unauthorized visitor is located in the room or space. Accordingly, some methods may further include using the security system 202 to determine the identity of the visitor, for example, via facial recognition or detecting a smart phone through NFC (at step 2004). As well, the identity of the visitor may be included in the alert that is sent to the remote user. For example, if the security system detects an unauthorized user, such as a toddler, near a swimming pool, the alert might say, "Timmy is located near the pool."

Figure 21:
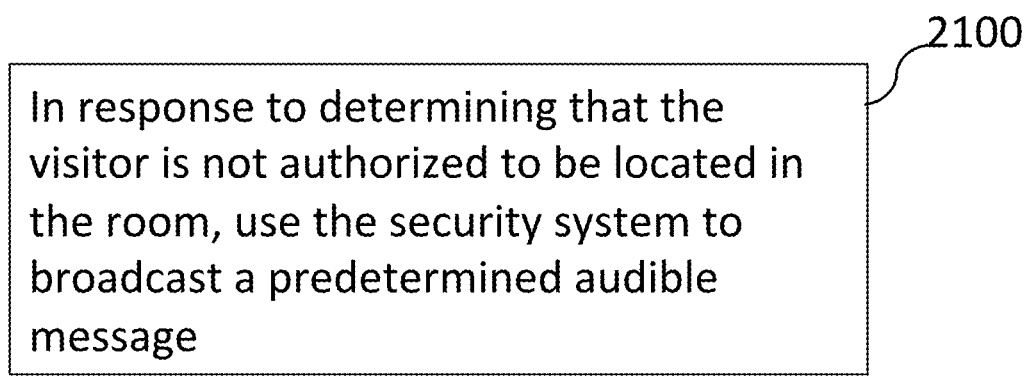
Figure 22:
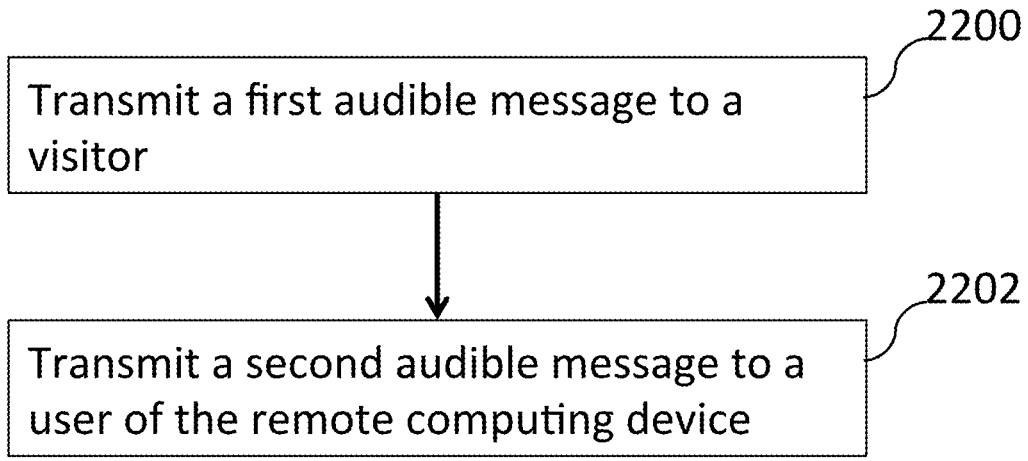
Figure 23:
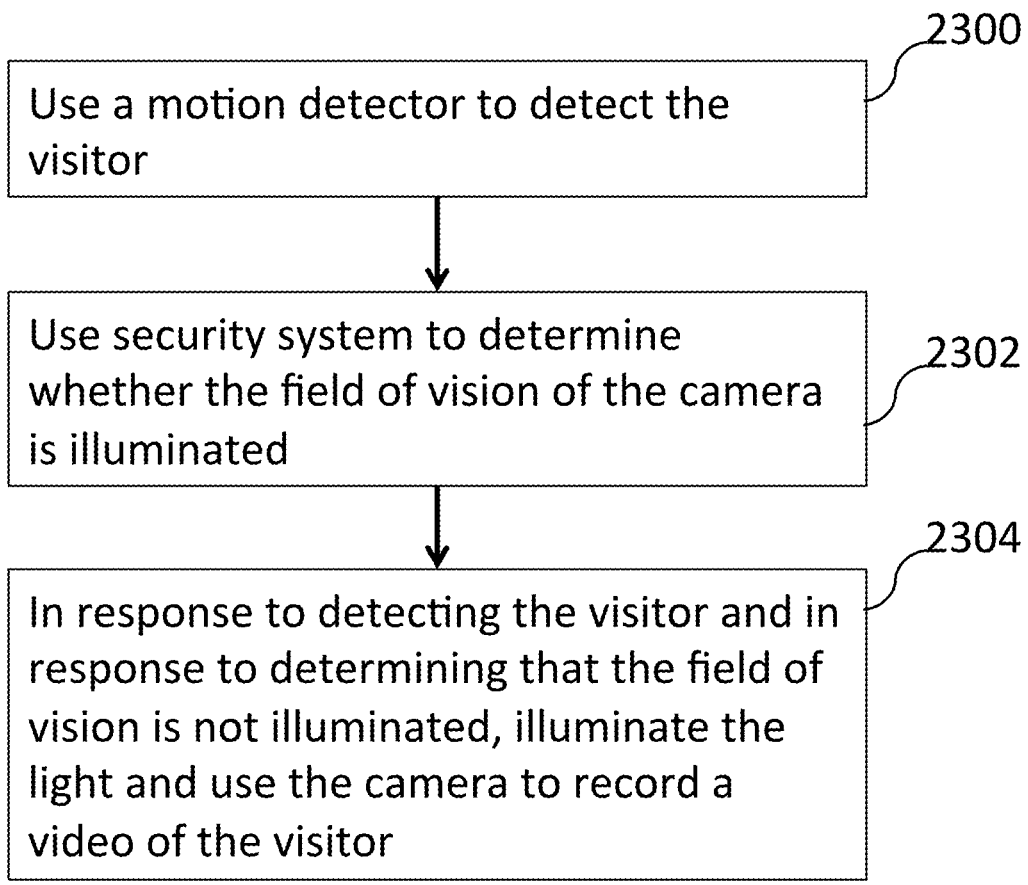

As shown in FIG. 21, in response to determining that the visitor is not authorized to be located in the room or space, such as near or in the swimming pool, some methods may further include using the security system to broadcast a pre-determined audible message (at step 2100). Using the example in the previous paragraph to further illustrate, when the security system 202 detects the toddler near the swimming pool, the security system 202 might sound an audible message via the speaker 236, such as, "PLEASE MOVE AWAY FROM THE POOL!"

Various methods may enable the visitor and remote user to communicate to each other through the security system 202. For example, some methods may include transmitting a first audible message to a visitor (at step 2200). In execution, the first audible message may be received by a microphone 234 in the remote computing device 204 and transmitted to the security system 202. As well, the first audible message may be audibly transmitted to the visitor via the speaker 236 in the security system 202. As well, methods may include transmitting a second audible message to a user of the remote computing device 204 (at step 2202). The second audible message may be received by the microphone 234 in the security system 202 and transmitted to the remote computing device 204. The second audible message may be audibly transmitted to the user via a speaker 236 in the remote computing device 204.

As well, methods may include using the motion detector 218 to detect the visitor (at step 2300) and using the security system 202 to determine whether the field of vision of the camera is illuminated (at step 2302). In response to detecting the visitor and in response to determining that the field of vision is not illuminated, the method may further include illuminating the light 626 and/or 630 and using the camera 208 to record a video of the visitor (at step 2304).

Figure 24:
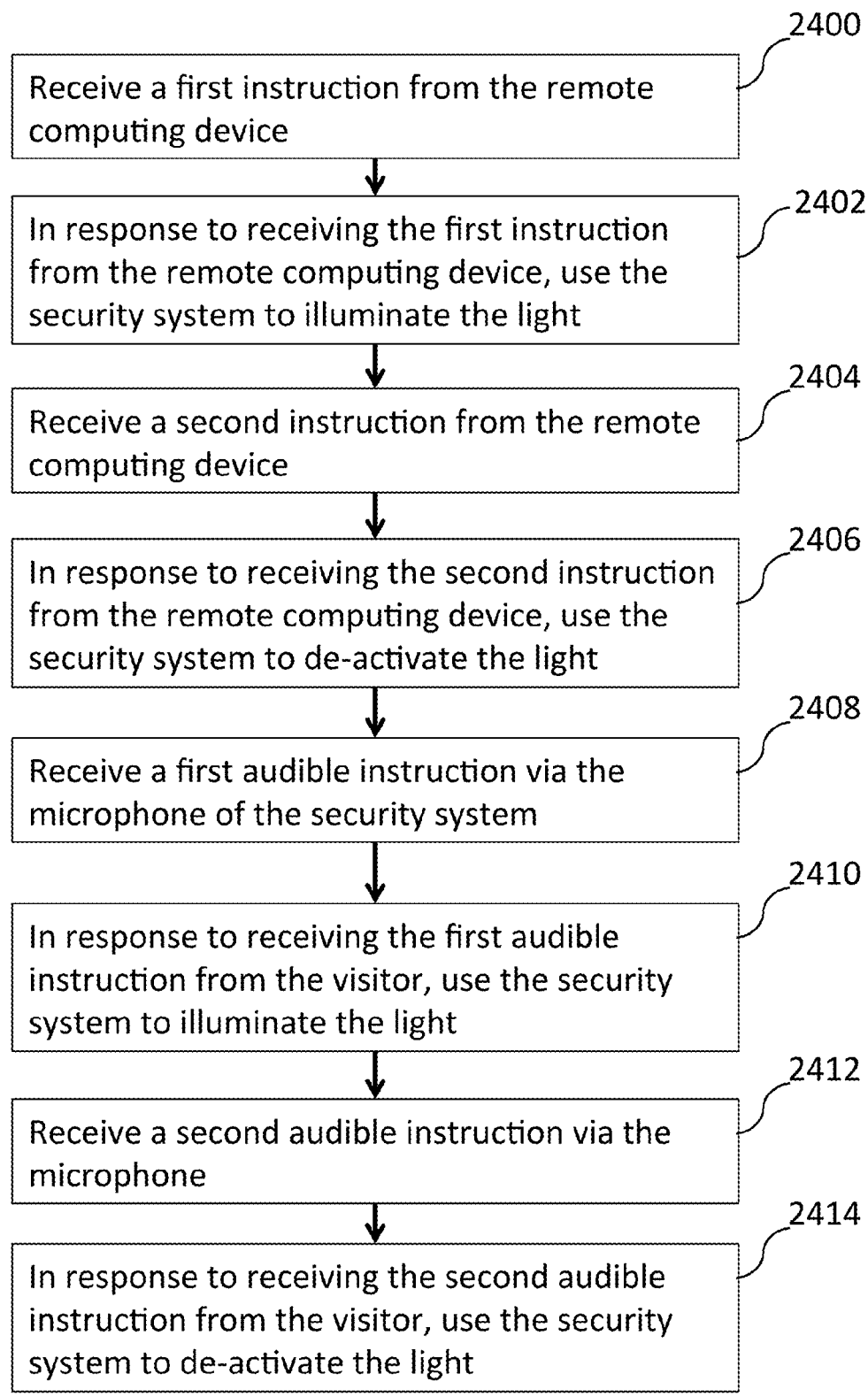

As illustrated in FIG. 24, methods may include receiving a first instruction from the remote computing device (at step 2400). In response to receiving the first instruction from the remote computing device 204, methods may include using the security system 202 to illuminate the light (at step 2402). As well, some methods may include receiving a second instruction from the remote computing device 204 (at step 2404). In response to receiving the second instruction from the remote computing device 204, methods may include using the security system 202 to de-activate the light 626 and/or 630 (at step 2406). Methods may also include receiving a first audible instruction via the microphone 234 of the security system 202 (at step 2408), and in response to receiving the first audible instruction from the visitor, the method may include using the security system 202 to illuminate the light 626 and/or 630 (at step 2410). As well, some methods may include receiving a second audible instruction via the microphone 234 of the security system 202 (at step 2412) and in response to receiving the second audible instruction from the visitor, the method may include using the security system 202 to de-activate the light 626 and/or 630 (at step 2414).

Figure 25:
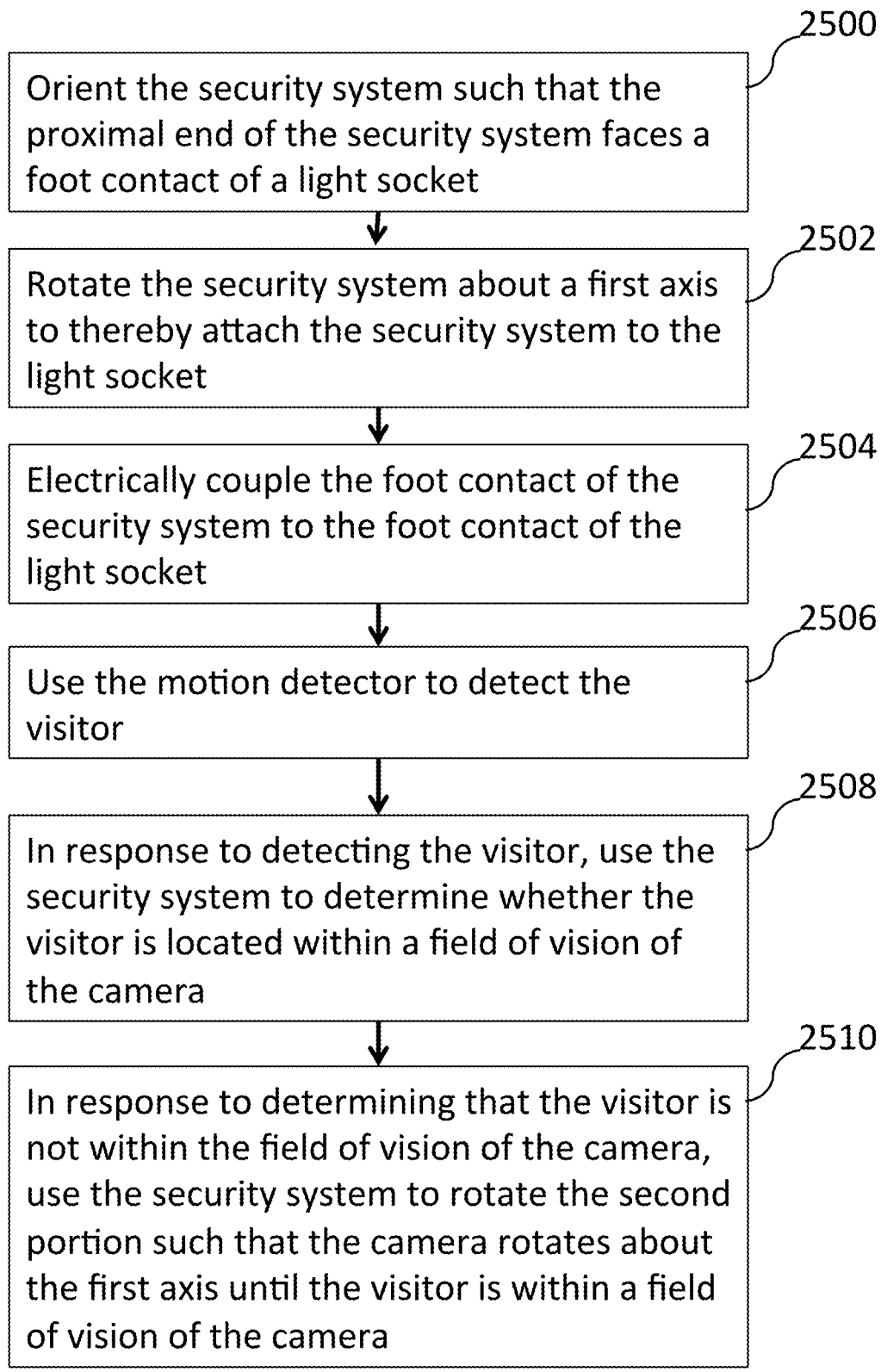

FIG. 25 illustrates a method that includes orienting the security system 202 such that the proximal end 280 of the security system 202 faces a foot contact 654 of a light socket 650 (at step 2500) and thereby rotating the security system 202 about a first axis 266 to thereby attach the security system 202 to the light socket 650 (at step 2502). The method may also include electrically coupling the foot contact 618 of the security system 202 to the foot contact 654 of the light socket 650 (at step 2504). Methods may include using the motion detector 218 to detect the visitor (at step 2506) and in response to detecting the visitor, the methods may include using the security system 202 to determine whether the visitor is located within a field of vision 238 of the camera 208 (at step 2508). In response to determining that the visitor is not within the field of vision 238 of the camera 208, methods may include using the security system 202 to rotate the second portion such that the camera 208 rotates about the first axis 266 until the visitor is within a field of vision 238 of the camera 208 (at step 2510).

Figure 26:
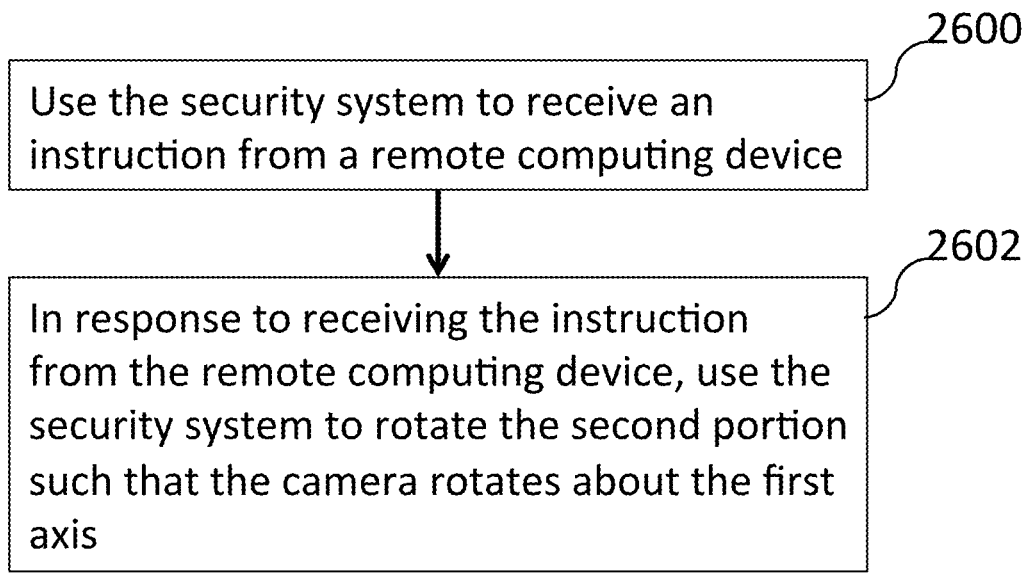
Figure 27:
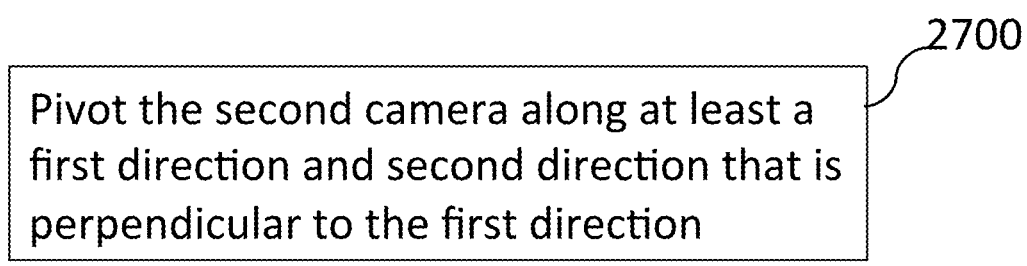

Furthermore, as shown in FIG. 26, methods may include using the security system 202 to receive an instruction from a remote computing device 204 (at step 2600). The instruction may comprise a command to rotate the second portion, or camera rotatable housing 658. In response to receiving the instruction from the remote computing device 204, the method may include using the security system 204 to rotate the second portion such that the camera 208 rotates about the first axis 266 (at step 2602). As well, as illustrated in FIG. 27, some methods may include a first and second camera, and the methods associated may thereby include pivoting the second camera along at least a first direction and a second direction that is perpendicular to the first direction (at step 2700).

Combinations with Embodiments Incorporated by Reference

The embodiments described herein can be combined with any of the embodiments included in the applications incorporated by reference. In various embodiments, the security systems described herein can include features and methods described in the context of security systems from applications incorporated by reference.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A surveillance system, comprising:
    a housing comprising a proximal end and a distal end;
    a screw thread located at the proximal end of the housing, wherein the screw thread is configurable to rotatably attach to a light socket;
    a camera located at the distal end of the housing; and
    a cone-shaped mirror located distal to the distal end of the housing such that a tip of the cone-shaped mirror is aligned with an optical axis of the camera.

2. The surveillance system of claim 1, wherein the tip is a first tip, wherein the cone-shaped mirror comprises a second tip located opposite the first tip, and the second tip is aligned with the optical axis of the camera.

3. The surveillance system of claim 2, wherein the cone-shaped mirror defines a first cone that extends from the first tip and a second cone that extends from the second tip, such that a first base of the first cone intersects a second base of the second cone.

4. The surveillance system of claim 1, further comprising a light coupled to the housing and a motion detector coupled to the housing.

5. The surveillance system of claim 1, further comprising a speaker coupled to the housing and a microphone coupled to the housing.

6. The surveillance system of claim 1, further comprising a remote computing device communicatively coupled to the camera, wherein the remote computing device is capable of displaying an image captured by the camera.

7. The surveillance system of claim 1, further comprising at least one support having a proximal end and a distal end, wherein the proximal end of the at least one support is coupled to the distal end of the housing and the distal end of the support is coupled to the cone-shaped mirror.

8. The surveillance system of claim 1, wherein the cone-shaped mirror is devoid of the enclosure around at least 75% of the perimeter of the cone-shaped mirror.

9. A surveillance system, comprising:
    a housing having a distal end and a proximal end;
    a screw thread located at the proximal end of the housing, wherein the screw thread is configurable to rotatably attach to a light socket;
    a camera located at the distal end of the housing, wherein the camera is configurable to detect an object; and
    a cone-shaped mirror coupled to the distal end of the housing and positioned such that a tip of the cone-shaped mirror faces the camera, wherein the cone-shaped mirror defines a symmetrical shape.

10. The surveillance system of claim 9, further comprising a support having a distal end and a proximal end, wherein the proximal end of the support is coupled to the distal end of the housing, and the distal end of the support is coupled to the cone-shaped mirror.

11. The surveillance system of claim 10, wherein the support is a first support, the surveillance system further comprising a second support having a distal end and a proximal end, wherein the proximal end of the second support is coupled to the distal end of the housing, and the distal end of the second support is coupled to the cone-shaped mirror.

12. The surveillance system of claim 11, wherein the first support is located opposite the second support.

13. The surveillance system of claim 9, further comprising at least one of an infrared light coupled to the housing, a motion detector coupled to the housing, a light coupled to the housing, and a microphone coupled to the housing.

14. A surveillance system, comprising:
a housing comprising a proximal end and a distal end;
a camera coupled to the housing;
a screw thread located at the proximal end of the housing, wherein the screw thread is configurable to rotatably attach to a light socket; and
a cone-shaped mirror located distal to the distal end of the housing, wherein the cone-shaped mirror comprises a first tip, a second tip located opposite the first tip, a first cone that extends from the first tip, and a second cone that extends from the second tip, wherein a first base of the first cone intersects a second base of the second cone.

15. The surveillance system of claim 14, further comprising a remote computing device communicatively coupled to at least one of the accelerometer and camera, wherein the remote computing device is capable of displaying an image captured by the camera.

16. The surveillance system of claim 15, wherein the surveillance system is configurable to automatically adjust an orientation of the image displayed by the remote computing device.

17. The surveillance system of claim 14, further comprising an infrared light coupled to the housing.

18. The surveillance system of claim 14, further comprising a motion detector coupled to the housing.

19. The surveillance system of claim 14, further comprising a microphone coupled to the housing.

20. The surveillance system of claim 14, further comprising an accelerometer coupled to the housing, wherein the accelerometer is configurable to determine orientation of the camera.

* * * * *